United States Patent
Lee

(10) Patent No.: US 11,967,248 B2
(45) Date of Patent: Apr. 23, 2024

(54) CONVERSATION-BASED FOREIGN LANGUAGE LEARNING METHOD USING RECIPROCAL SPEECH TRANSMISSION THROUGH SPEECH RECOGNITION FUNCTION AND TTS FUNCTION OF TERMINAL

(71) Applicant: Jangho Lee, Seoul (KR)

(72) Inventor: Jangho Lee, Seoul (KR)

( * ) Notice: Subject to any disclaimer, the term of this patent is extended or adjusted under 35 U.S.C. 154(b) by 346 days.

(21) Appl. No.: 17/425,947

(22) PCT Filed: Dec. 12, 2019

(86) PCT No.: PCT/KR2019/017584
§ 371 (c)(1),
(2) Date: Jul. 27, 2021

(87) PCT Pub. No.: WO2020/159073
PCT Pub. Date: Aug. 6, 2020

(65) Prior Publication Data
US 2022/0139256 A1    May 5, 2022

(30) Foreign Application Priority Data

Jan. 29, 2019  (KR) ........................ 10-2019-0011364
Sep. 10, 2019  (KR) ........................ 10-2019-0111899
Dec. 4, 2019   (KR) ........................ 10-2019-0159540

(51) Int. Cl.
*G09B 19/06*   (2006.01)
*G06F 40/263*  (2020.01)
(Continued)

(52) U.S. Cl.
CPC ........... *G09B 19/06* (2013.01); *G06F 40/263* (2020.01); *G09B 5/06* (2013.01); *G10L 13/08* (2013.01);
(Continued)

(58) Field of Classification Search
CPC ........... G09B 19/06; G09B 5/06; G10L 15/26; G10L 15/22; G10L 13/00; G10L 13/08
See application file for complete search history.

(56) References Cited

U.S. PATENT DOCUMENTS

2001/0029455 A1*  10/2001  Chin ....................... G06F 40/58
                                                           704/277
2009/0053681 A1    2/2009  Shen et al.
(Continued)

FOREIGN PATENT DOCUMENTS

JP   2003515816   *   5/2003
KR   100898104        5/2009
(Continued)

OTHER PUBLICATIONS

"International Search Report (Form PCT/ISA/210) of PCT/KR2019/017584," dated Apr. 8, 2020, with English translation thereof, pp. 1-4.

*Primary Examiner* — Robert J Utama
(74) *Attorney, Agent, or Firm* — JCIPRNET

(57) ABSTRACT

A method for foreign language learning between a learner and a terminal, based on video or audio containing foreign language, particularly, to a conversation-based foreign language learning method using a speech recognition function and a TTS function of a terminal, a learner learns a foreign language in a way that: the terminal reads a current learning target sentence to the learner to allow the learner to speak the current learning target sentence after the terminal, when speech input by the learner in a speech waiting state of the terminal is the same as the current learning target sentence or belongs to the same category as the current learning target sentence; and the terminal and the learner alternately speak sentences one-by-one when the speech input by the learner is the same as the next sentence of the current learning target sentence or belongs to the same category as the next sentence.

28 Claims, 3 Drawing Sheets

(51) Int. Cl.
  *G09B 5/06* (2006.01)
  *G10L 13/08* (2013.01)
  *G10L 15/00* (2013.01)
  *G10L 15/22* (2006.01)
  *G10L 15/26* (2006.01)

(52) U.S. Cl.
  CPC ............ *G10L 15/005* (2013.01); *G10L 15/22* (2013.01); *G10L 15/26* (2013.01); *G10L 2015/223* (2013.01)

(56) References Cited

U.S. PATENT DOCUMENTS

| | | | | |
|---|---|---|---|---|
| 2011/0053124 | A1* | 3/2011 | Jung | G09B 19/06 434/157 |
| 2019/0311647 | A1* | 10/2019 | Shete | G09B 5/06 |
| 2020/0327817 | A1* | 10/2020 | Raynaud | G09B 5/06 |

FOREIGN PATENT DOCUMENTS

| | | |
|---|---|---|
| KR | 100954498 | 4/2010 |
| KR | 101125572 | 3/2012 |
| KR | 101283271 | 7/2013 |
| KR | 101427528 | 8/2014 |
| KR | 101690546 | 1/2017 |

\* cited by examiner

CONVERSATION-BASED FOREIGN LANGUAGE LEARNING METHOD USING RECIPROCAL SPEECH TRANSMISSION THROUGH SPEECH RECOGNITION FUNCTION AND TTS FUNCTION OF TERMINAL

CROSS-REFERENCE TO RELATED APPLICATION

This application is a 371 application of the International PCT application serial no. PCT/KR2019/017584, filed on Dec. 12, 2019, which claims the priority benefit of Korean Patent Application no. 10-2019-0011364, filed on Jan. 29, 2019, Korean Patent Application no. 10-2019-0111899, filed on Sep. 10, 2019, and Korean Patent Application no. 10-2019-0159540, filed on Dec. 4, 2019. The entirety of each of the above mentioned patent applications is hereby incorporated by reference herein and made a part of this specification.

TECHNICAL FIELD

The present invention relates to a conversation-based foreign language learning method that enables foreign language learning through natural conversation between a learner and a terminal, such as a smartphone, a tablet computer, a notebook computer, a talking toy, an AI speaker, and the like, based on video or audio content (hereinafter referred to as "foreign language content" or "content") containing foreign language sound expressions, such as movies, dramas, pop songs, news, and the like, via speech transmission using a speech recognition function and a text-to-speech (TTS) function of the terminal. More particularly, the present invention relates to a conversation-based foreign language learning method using a speech recognition function and a text-to-speech (TTS) function of a terminal, by which a learner learns a foreign language in a way that: the terminal executes a preset command in response to speech input by the learner in a speech waiting state for speech recognition and enters the speech waiting state again upon determining that the speech input by the learner corresponds to the preset command; the terminal enters the speech waiting state after reading the next learning target sentence of a current learning target sentence to the learner such that the learner speaks the next learning target sentence after the terminal, upon determining that the speech input by the learner is the same as the current learning target sentence or belongs to the same category as the current learning target sentence, and enters the speech waiting state after reading the current learning target sentence to the learner again such that the learner speaks the current learning target sentence after the terminal, upon determining that the speech input by the learner does not belong to the same category as the current learning target sentence; and the terminal and the learner alternately speak sentences one-by-one when the speech input by the learner is the same as the next learning target sentence of the current learning target sentence or belongs to the same category as the next learning target sentence, whereby the learner can naturally learn the foreign language through interactive conversation with the terminal via speech transmission without touch, if any, a screen of the terminal or by minimizing the touch of the screen of the terminal to exceptional cases.

BACKGROUND ART

In general, various foreign language learning methods have been used to learn foreign languages using foreign language content and devices adapted to read content, such as PCs, notebook computers, tablet computers, smartphones, and the like, and recently, as speech recognition technology and TTS technology can be applied to such devices, various foreign language learning methods adopting such technologies have been proposed.

In addition, companies, such as Google and Samsung, have developed programs that combine TTS technology with speech recognition technology, such as Google Assistant and Samsung Bixby, to allow users to ask a question or to execute a function of a terminal by speaking to the terminal.

However, the foreign language learning method using the foreign language content is mainly aimed at allowing a learner to enjoy video or audio content executed by a terminal and is not carried out through conversation between the learner and the terminal via speech transmission, thereby providing an insufficient opportunity for the learner to speak by himself or herself. Moreover, since the program adopting the speech recognition function to make the learner execute or search for a certain function on the terminal with words is not basically aimed at proper foreign language learning, it is not easy for the learner to have a conversation using the program unless the learner has already studied a corresponding foreign language to some extent to continue a conversation in the foreign language, and even if a learner has an ability to communicate to some extent, the program is not suitable for foreign language learning since the program has a limitation in conversation topics and does not guarantee accuracy of expressions used by the learner.

Prior documents of the present invention include KR Patent Registration No. 10-0954498, No. 10-1125572, No. 10-1427528, and the like.

DISCLOSURE

Technical Problem

The present invention is developed to solve such problems of conventional techniques. The inventors conceived technical ideas that a learner can be guided to learn a foreign language by having a continuous conversation with a terminal through speech transmission using speech recognition technology and TTS technology to have an opportunity to speak the foreign language with his or her own voice as much as possible and to learn correct foreign language expressions by continuing interactive conversation with the terminal through speech transmission based on foreign language content corresponding to a collection of correct foreign language expressions, and completed the present invention by sequentially solving various problems in the course of specifying the technical ideas.

In order to allow a learner to learn a foreign language through conversation with a terminal, such as a smartphone, a tablet computer, a notebook computer, a talking toy, an AI speaker, and the like, which has a speech recognition function and a text-to-speech (TTS) function, using foreign language content through application of the speech recognition function and the text-to-speech (TTS) function, problems to be solved by the present invention are as follows:

(1) In order to allow a learner to learn a foreign language through communication with a terminal instead of pressing a button on the terminal, it is necessary to allow the terminal to enter a speech input state in response to speech input by a learner (hereinafter referred to as "speech waiting state" or "waiting state") such that the learner inputs the speech through the terminal substantially in all situations that request the learner to press the button in conventional techniques. However, since it is necessary for the learner to press a button which makes the terminal return back to the waiting state in a program adapted to execute the speech recognition function, this requirement does not meet the objective of the present invention to allow transmission of most commands through learner voice. Therefore, in order to completely achieve the objective of the present invention, the program includes creation of the waiting state for the learner to transmit commands with voice among content to be executed by voice commands of the learner.

(2) When the learner inputs a voice in the speech waiting state of the terminal, the terminal is required to recognize meanings of each voice command spoken by the learner and to react through foreign language speech in response to the voice command or to execute a function corresponding thereto. As a result, foreign language learning is carried out through interactive conversation between the learner and the terminal via speech transmission, thereby providing an opportunity for the learner to speak the foreign language as much as possible while preventing a problem that the learner stops conversation with the terminal in the course of touching a screen of the terminal. To this end, it is necessary for the terminal to store separate command expressions to be transmitted to the terminal by the learner through learner voice and to execute a function corresponding to an expression spoken by the learner upon determining that the expression corresponds to a preset command.

(3) In order to allow the learner to learn a foreign language through interactive conversation with the terminal between the learner and the terminal via speech transmission using foreign language expressions in the foreign language content, there is a need for a learning method in which the terminal plays a learning target sentence with a content sound or a TTS sound such that the learner speaks the learning target sentence after the terminal. By such a learning method, the learner is able to understand a correct pronunciation method and correct foreign language expressions. In the course of performing such foreign language learning, it is necessary to allow the terminal to react in various ways based on determination as to whether the learner correctly speaks a learning target sentence. That is, if the learner correct speaks the learning target sentence, it is determined that the learner has sufficiently carried out foreign language learning and the learner is guided to learn the next learning target sentence, and if the learner fails to correctly speak the learning target sentence, the learner is guided to carry out learning of the current learning target sentence. Here, upon determining whether the sentence spoken by the learner matches the current learning target sentence, it is very difficult to achieve an accurate determination result due to limitations of foreign language pronunciation ability of the learner and recognition ability of the speech recognition program. Thus, if the learner is requested to perform foreign language learning based on the current language alone, the learner can give up learning of other foreign language sentences and can consume an excessive time due to learning a single foreign language sentence, thereby making it difficult to achieve foreign language learning through natural conversation. Therefore, it is necessary to solve such problems in order to achieve foreign language learning in a more natural conversation format.

(4) In order to achieve natural conversation-based foreign language learning, there is a need for a means for foreign language learning through interactive conversation in which the terminal and the learner alternately speak sentences one by one. However, since foreign language learning cannot be sufficiently achieved only through a process in which the learner listens to and speaks a current sentence or several sentences executed by the terminal, there is a need for a foreign language learning method that allows the learner to have an actual interactive conversation with the terminal using an ability obtained through such a foreign language learning process and to continue foreign language learning based on a result of the conversation.

(5) In a typical method in which the learner presses a button (including a button for making the terminal enter the speech waiting state), since the learner waits until a button for execution of the next learning target sentence by the terminal is pressed (for example, until video or audio execution for one learning target sentence is completed), based on determination when the button should be pressed, and presses the button to allow the terminal to execute the next learning target sentence, there is no need for consideration of a time at which the learner presses the button. However, in order to replace manipulation of pressing the button by speech transmission of the learner, it is necessary to allow the terminal to enter the waiting state for receiving speech of the learner when the button is pressed by the learner in the related art. Accordingly, foreign language learning can be carried out through more natural conversation if it is possible to calculate and deliver information about the time when the terminal should be turned into the waiting state.

(6) There are some differences between foreign language expressions realized by sounds or subtitles in foreign language content (since there are cases where audio content is also displayed together with subtitles, such as lyrics and lines, all cases displayed as subtitles regardless of the form of lyrics or lines will be referred to as subtitles.) and sound or text expressions generated by the learner speaking the foreign language expressions after the sounds or the subtitles. A means for overcoming such differences enables foreign language learning in a more natural conversation format. In comparison of texts of both sentences in a process of comparing the content of speech input by the learner and the sentence content of the foreign language content, the following points should be considered. Even if the subtitles in the foreign language content are exactly correct, the sentence expressions in the form of text contained in the subtitles can be inconsistent with sentence expressions generated by a speech recognition function of the terminal from several viewpoints. For example, the two sentences are different depending upon uppercase and lowercase characters for each program, punctuation marks, such as question marks, exclamation marks, quotation marks, and parentheses, and use of various unit indicators, such as $, kg, and %, expression methods of numbers or proper nouns, and the like, which are provided by speech recognition programs used in the terminal. In general, since a computer recognizes a blank as a single character in determining identity between two character strings, a determination result as to the identity between the character strings varies depending on the presence of the blank and the location and number of the blank. As a result, even though the text in the subtitles and the text generated through the speech recognition function have substantially the same meaning, there are cases where these texts are recognized as being not identical. If such a difference exists, the terminal treats the learner as having made an incorrect expression even through the learner makes a correct foreign language expression. Therefore, it is possible to achieve foreign language learning in a more natural conversation format through the means for overcoming such differences.

(7) In order to allow more natural and easier foreign language learning through interactive conversation between the learner and the terminal, there is a need for additional means for compensating for difficulty of speaking after the learner listens to a learning target sentence provided as a content sound and understands the learning target sentence.

In the course of foreign language learning through speech transmission between the learner and the terminal while minimizing contact with the button or the screen of the terminal, confusion can occur between voice commands given by the learner to the terminal and expressions of the learning target sentence, causing an unexpected response of the terminal to the learner. An additional means for preventing confusion between the voice commands and the learning target sentences enables more natural foreign language learning of the learner through interactive conversation with the terminal via speech transmission.

According to pronunciation ability, the learner can speak all or part of the learning target sentence (including all forms of phonemes, syllables, and words) so as not to be recognized as the learning target sentence. Thus, there is a need for a means for clarifying a part of the sentence often misspelled by the learner. Such a means allows the learner to intensively learn the frequently misspelled part of the learning target sentence, thereby enabling improvement in foreign language pronunciation ability of the learner while enabling foreign language learning through natural conversation.

(8) It is necessary to prevent occurrence of a situation in which the learner finds and presses the button for making the terminal enter the waiting state since the terminal does not enter the waiting state and the learner cannot input speech even though the learner is required to input the speech. In general, in the waiting state of the terminal in the speech recognition program, the terminal sends a special sound signal to the learner or displays an icon of a specific shape on the screen together with the sound signal to notify that the terminal is ready to accept the speech input by the learner, and is then maintained in this state for a few seconds (generally, 5 to 7 seconds). Then, if there is no voice input, the terminal changes the shape of the icon and does not return to the waiting state unless the part is touched again. In order to achieve the objectives of the present invention, it is necessary to prevent occurrence of such a situation in which the waiting state is lost, and if the waiting state is lost, it is necessary to devise an additional means for converting the terminal into the waiting state without finding and pressing the button.

(9) In order for the learner to continue foreign language learning through interactive conversation with the terminal without losing interest, there can be a need for an additional means that can inspire learner's motivation to learn the foreign language and allows parents and teachers to check the learner's achievements by guiding the learner to speak a correct foreign language expression such that the terminal performs a predetermined function or by reflecting and displaying learning performance of the learner in numerical values in the cases where the learner carries out the next stage of foreign language learning by speaking a correct expression in learning target content, where the learner patiently continues foreign language learning for a considerable period of time, and the like. When the method according to the present invention is realized through a server, such a means can induce competition through comparison among several learners, thereby further inspiring learners' motivation to achieve foreign language learning. Therefore, the means for calculating and displaying the learning performance of the learners as described above may be included in the objectives of the present invention.

(10) In the method according to the present invention, when the learner speaks a command or a learning target sentence with his/her own voice, there can continuously occur a situation in which the terminal determines whether the speech input by the learner matches a sentence of a command or a learning target sentence previously stored in the terminal. In this process, the terminal executes the speech recognition function by recording the speech input by the learner, extracting necessary data from the recording result, and comparing the data with comparison data in a speech recognition algorithm. Then, if the speech input by the learner is not stored after such comparison, the recording result can be removed. Here, the result of recording what the learner speaks with his/her own voice with an intention of correctly reading a certain sentence is stored corresponding to the learning target sentence and data is extracted from the recording result so as to be used for various purposes including performing the speech recognition function. Therefore, there is a need for a means that can store the recording result corresponding to the learning target sentence instead of removing the recording result to be used as data for more efficient speech recognition and foreign language learning.

In addition, there is a need for a means that allows a speech recognition device to recognize what the learner speaks with an intention of correctly reading a learning target sentence and can store text of the recognized result separately from the learner's voice so as to be used for various purposes mentioned above.

(11) Applications implementing the present invention (hereinafter, referred to as "apps") employ foreign language content and can require permission of a copyright holder for use of the foreign language content depending upon the foreign language content. Since the foreign language content is not originally created with the purpose of foreign language learning through natural conversation format, there can be cases where it is necessary to obtain permission from the copyright holder for use of such content for foreign language learning. Although there is a law that makes it possible to use such content for educational purposes without permission of the copyright holder, it is often unclear whether it is necessary to obtain permission of the copyright holder in the case of commercial use of such content. Therefore, there is a need for a means that can prevent implementation of the present invention from becoming illegal by confirming in the course of implementing the present invention whether the foreign language content given as a learning target is implemented under the permission of the copyright holder.

(12) For foreign language learning, there is a need for subtitles which make a learner understand meanings of a foreign language to be learned by the learner. Therefore, there is a need for means that provide a plurality of such subtitles in different languages, allow the plurality of subtitles to be displayed on a screen for learning, and allow the learner to use the subtitles in a language other than his/her native language for learning of a second foreign language, whereby learners of different languages can use the terminal together while allowing the learners to learn a second foreign language.

Technical Solution

In accordance with one aspect of the present invention, there is provided a conversation-based foreign language learning method using a speech recognition function and a TTS function of a terminal through interactive conversation between a learner and a terminal based on video or audio foreign language content containing a plurality of foreign language learning target expressions, wherein the terminal informs the learner of a speech waiting state of the terminal with a sound signal and/or through a screen thereof with an image indicating the speech waiting state of the terminal, and, when the learner inputs speech to the terminal in the speech waiting state, the terminal responds according to the content of the input speech and returns to the speech waiting state, whereby the learner can perform foreign language learning through interactive conversation between the learner and the terminal via speech transmission without touch of, if any, a screen or by minimizing the touch of the screen to exceptional cases.

The terminal may previously store voice commands to be delivered from the learner to the terminal in a server or the cloud and may execute a corresponding command upon determining that the speech input by the learner in the speech waiting state matches a specific command through comparison with the stored command.

In order to prevent unexpected reaction of the terminal due to confusion between the voice command given by the learner to the terminal and expressions of a learning target sentence, an identifier may be added to all or part of the voice commands delivered from the learner to the terminal so as to prevent confusion with the learning target sentence.

In the conversation-based foreign language learning method, foreign language learning may be repeatedly carried out by allowing the terminal to provide the speech waiting state after reading the next learning target sentence of a current learning target sentence to the learner such that the learner speaks the next learning target sentence after the terminal, upon determining that the speech input by the learner is the same as a current learning target sentence or belongs to the same category as the current learning target sentence, or to provide the speech waiting state after reading the current learning target sentence to the learner again such that the learner speaks the current learning target sentence after the terminal, upon determining that the speech input by the learner is not is the same as the current learning target sentence or does not belong to the same category as the current learning target sentence.

In the conversation-based foreign language learning method, foreign language learning may be repeatedly carried out by allowing the terminal and the learner to alternately speak sentences one-by-one upon determining that the speech input by the learner is the same as the next learning target sentence of the current learning target sentence or belongs to the same category as the next learning target sentence.

A period of time until the terminal enters the speech waiting state may be set in consideration of a length of a corresponding foreign language learning target sentence and a period of time for which the corresponding foreign language learning target sentence is executed in the foreign language content.

In determination as to whether the speech input by the learner is the same as learning target expressions in the foreign language content or belongs to the same category as the learning target expressions, texts of both sentences may be compared assuming that punctuation marks, such as a question mark (?), an exclamation point (!), a comma (,), a period (.), a quotation mark (" "), a hyphen (-), a center point (•), parentheses {( )}, curly braces ({ }), square brackets ([ ]), or spaces incorrectly added at the beginning and end of sentences, and spaces overlapping each other are absent; and that an expression of numbers in Arabic numerals and an expression of numbers with letters; an expression of following verbs or auxiliary verbs in abbreviated forms using an apostrophe (') after a subject and an expression of original forms thereof without using abbreviations; an expression of negative sentences in abbreviated forms using an apostrophe (') and an expression of original forms thereof without using abbreviations; "going to" and "gonna"; "want to" and "wanna"; "got to" and "gotta"; or a sentence used by distinguishing between uppercase and lowercase characters and a sentence used without distinction therebetween are regarded as being exactly or partially identical to each other.

When learning with respect to a foreign language learning target sentence is repeated due to failure of the learner to continuously input speech that belongs to the same category as the foreign language learning target sentence or when the learner inputs simple speech, such as "yes" and "okay", or a preset voice command, such as "you speak the next learning target sentence", the terminal may stop reading of the current learning target sentence and may proceed to the next learning target sentence to allow the learner to learn the next learning target sentence.

A terminal having a screen may display a current learning target sentence together with the next learning target sentence.

The conversation-based foreign language learning method further includes a process in which the terminal reads a part (one or multiple words or characters) of a specific sentence to the learner with a TTS sound among learning target sentences, enters the speech waiting state and informs the learner of the speech waiting state to allow the learner to speak the part of the specific sentence after the terminal; and the terminal proceeds to and read a part of the next learning target sentence to the learner with a TTS sound enters the speech waiting state and informs the learner of the speech waiting state to allow the learner to speak the part of the next learning target sentence after the terminal upon determining that speech input by the learner is the same as the part of the learning target sentence provided through TTS or belongs to the same category as the part of the learning target, and the terminal reads the same part of the specific sentence to the learner with the TTS sound to allow the learner to speak the same part of the specific sentence after the terminal, upon determining that the recognition result is not the same as the part of the learning target sentence provided through TTS or does not belong to the same category as the part of the learning target.

The terminal may read native language subtitles to the learner with a TTS sound corresponding to a foreign language content sound for the learning target sentence before the terminal provides the foreign language content sound or a TTS sound for the learning target sentence to the learner.

The terminal may read the learning target sentence to the learner with a TTS sound before the terminal provides a foreign language content sound for the learning target sentence to the learner.

The terminal may read native language subtitles to the learner with a TTS sound corresponding to a foreign language content sound for the learning target sentence or may read the learning target sentence to the learner with a TTS sound before the terminal provides the foreign language content sound or the TTS sound for the learning target sentence to the learner.

When the speech waiting state of the terminal disappears, the learner may be guided to press one or more buttons on a remote controller (including a pen of Samsung Galaxy Note) or earphones without touching the screen on the terminal, or may be guided to use another software program for speech recognition, such as Samsung Bixby or Google Assistant, so as to activate the speech waiting state.

Further, in a process of allowing the learner to learn a foreign language through interactive conversation using the foreign language content, performance of foreign language learning of the learner may be evaluated and displayed numerically.

When the terminal proceeds to the next learning target sentence to perform foreign language learning based on determination that the speech input by the learner is exactly the same as the current learning target sentence, speech recording data of the learner may be stored corresponding to the learning target sentence such that speech recording data generated by exactly speaking a specific sentence can be preserved and used as needed.

Upon determining that speech input by the learner is not exactly the same as a learning target sentence, text converted from the speech of the learner by a speech recognition function of the terminal may be stored corresponding to the learning target sentence or a sentence number thereof.

Upon determining that speech input by the learner is not exactly the same as a learning target sentence, a difference between the text converted from the speech of the learner by the speech recognition function of the terminal and the learning target sentence may be extracted and informed to the learner.

Upon determining that speech input by the learner is not exactly the same as a learning target sentence, a difference between the text converted from the speech of the learner by the speech recognition function of the terminal and the learning target sentence may be stored and sentences in which the learner most frequently makes mistakes may be ranked based on the stored data to provide all or some of the sentences to the learner.

In addition, the method according to the present invention may include a process of displaying a message asking to execute foreign language learning after storing foreign language content with permission of a copyright holder in a storage device, followed by prohibiting foreign language learning, upon determining that there is no foreign language content with permission of the copyright holder in the storage device.

The method may include at least one selected from the group consisting of a process of recording and storing data obtained by exactly speaking a learning target sentence by the learner to use the data as data for improving speed and accuracy of speech recognition in comparison with a content sound for the corresponding sentence, a process of recording and storing data obtained by exactly speaking a learning target sentence by the learner to use the data as data for improving speed and accuracy of speech recognition in comparison with previous recording data of the learner, a process of recording and storing data obtained by exactly speaking a learning target sentence by the learner to use the data as assistant data in comparison with data for speech recognition stored in the storage device by a speech recognition system, and combinations thereof.

The terminal may be provided with a plurality of subtitles created using a plurality of languages including a native language of the learner such that subtitles created using a foreign language can be displayed on the screen of the terminal by learner selection, followed by allowing the terminal to read all or part of a certain subtitle to the learner among the subtitles displayed on the screen using a TTS function of the terminal and to respond to a recognition result generated by recognizing speech input by the learner through a speech recognition function of the terminal when the learner inputs the speech after the terminal.

The present invention provides an application program including the conversation-based foreign language learning method according to the present invention.

Advantageous Effects

The conversation-based foreign language learning method using a speech recognition function and a TTS function of the terminal according to the present invention allows a learner to have interactive conversation with a terminal using one sentence in foreign language content contained in the terminal while using the terminal like a native speaker friend or teacher accompanying with the learner, and allows the terminal to respond to speech of the learner such that the learner repeatedly speaks a foreign language sentence until the learner speaks a correct foreign language sentence by immediately determining whether the foreign language sentence spoken by the learner is correct, thereby making it possible for the learner to learn foreign languages naturally. The method according to the present invention provides many advantages as compared with the case of receiving a particularly expensive private school or private tutoring. As a result, since the learner is not restricted by place and time, the learner can improve an ability to speak a foreign language through repeated learning. The method according to the present invention allows the learner to play a role of a protagonist in scenes while repeatedly watching or listening to his or her favorite movies, dramas, and pop songs or to repeat learning to an extent that they can memorize lines of famous scenes.

In order to evaluate through the speech recognition function that the learner correctly speaks a learning target sentence, the learner is required to speak most identically to a foreigner's voice. In order to receive such an evaluation, the learner is guided to make an effort to correct his or her pronunciation, thereby achieving improvement in foreign language learning.

According to the present invention, in a first stage of an implementation process, the learner is guided to understand the overall content of foreign language content while watching video or listening to audio, and is guided to practice speaking of each learning target sentence in the foreign language content to be similar to learning target sentences generated with a content sound or a TTS sound while listening to the learning target sentences generated with the content sound or the TTS sound, after or as soon as the learner understands the overall content. Such processes for foreign language learning through interactive conversation may be performed while the learner walks on a street using earphones regardless of location or may be performed using a terminal not including a screen or in a situation making it difficult for the learner to watch, if any, the screen of the terminal at night, whereby the learner can more naturally enjoy foreign language learning through interactive conversation by understanding media content, such as movies, dramas, pop songs, and news, in a short period of time and memorizing the media content, depending on an effort level of the learner. Since such learner's achievements can be easily confirmed by the learner himself/herself or by learner's parent by the method of displaying performance of foreign language learning according to the present invention, thereby further improving the effect of foreign language learning.

According to the present invention, learner's voice data corresponding to a specific sentence generated in the course of performing foreign language learning is stored and utilized, whereby the learner can speak a foreign language more correctly and can perform foreign language learning through more natural conversation.

According to the present invention, speech data generated by correctly reading learning target sentences by the learner are recorded and stored as data for improvement in speed and accuracy of speech recognition through comparison with content sounds with respect to the corresponding foreign language learning target sentences or through comparison with previous recording files generated by the learner and corresponding to the learning target sentences, as assistant data in comparison with data for speech recognition stored in the storage device by the speech recognition system, or as data for improvement in speech recognition efficiency through one of the above methods or through a combination thereof.

According to the present invention, the learner may be informed of a difference between texts generated by incorrectly speaking learning target sentences and the learning target sentences among texts generated by the speech recognition function of the terminal when the learner speaks with an intention of correctly speaking the learning target sentences, and the most incorrect parts may be ranked and the learner may be informed thereof, thereby guiding the learner to correct incorrectly spoken parts.

According to the present invention, the method may include a process of displaying a message asking to execute foreign language learning after storing foreign language content with permission of a copyright holder in a storage device, followed by making it impossible to perform foreign language learning, upon determining that there is no foreign language content with permission of the copyright holder in the storage device, thereby preventing occurrence of illegal matters, such as violation of copyright law, by the learner.

According to the present invention, the terminal may provide a plurality of subtitles in different languages to allow learners of different languages to perform foreign language learning using apps or devices adopting the method according to the present invention, and may display subtitles in a language other than a learner's native language on a screen of the terminal by learner selection such that the learner can learn a second foreign language through interactive conversation based on the subtitles using the TTS function and the speech recognition function.

BEST MODE

Figure 1:
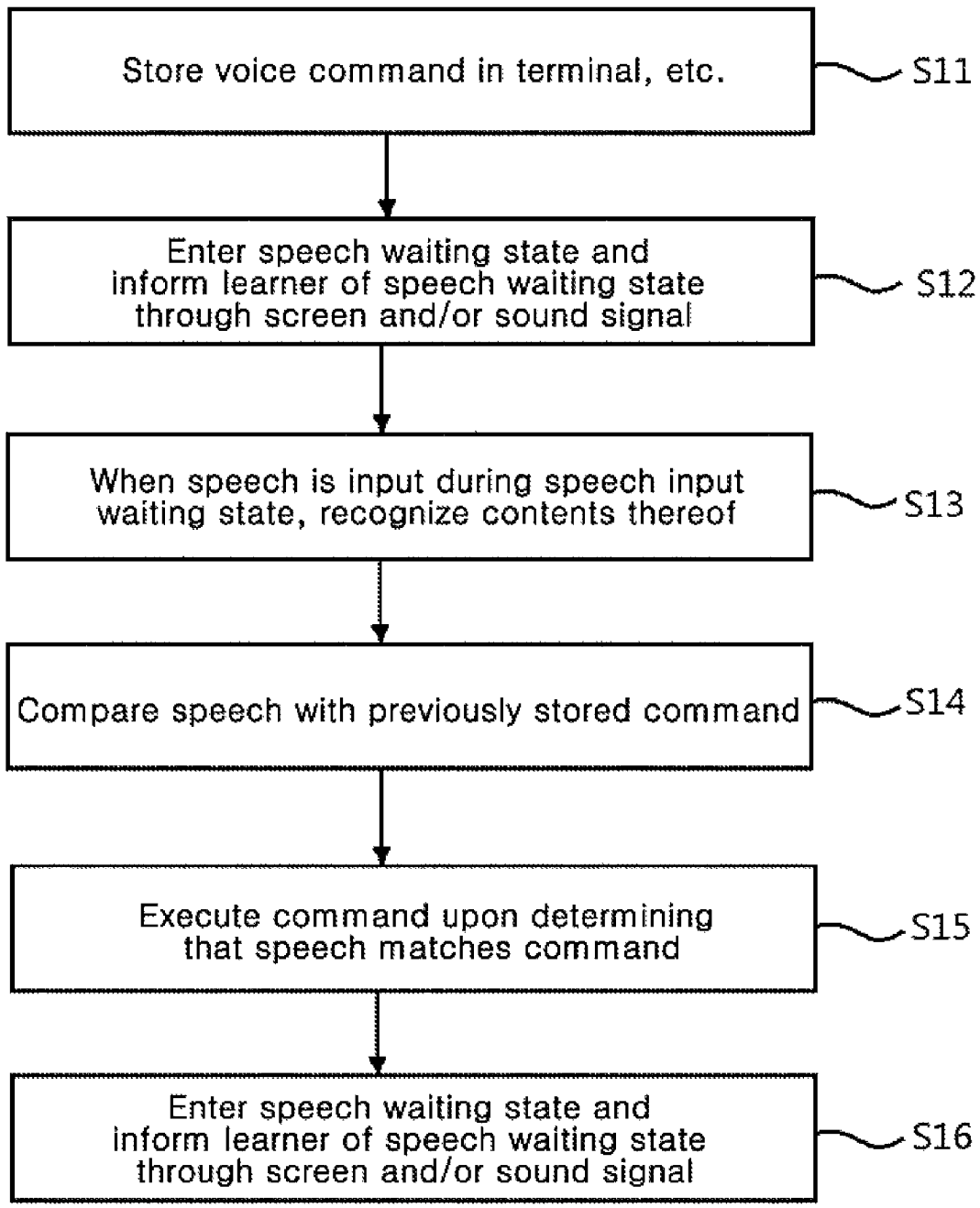
FIG. 1 is a flowchart of a command recognition process in a conversation-based foreign language learning method using a speech recognition function and a TTS function according to the present invention.

The present invention relates to a conversation-based foreign language learning method that enables foreign language learning through interactive conversation between a learner and a terminal, such as a smartphone, a tablet computer, a notebook computer, a talking toy, an AI speaker, and the like, based on foreign language content, such as movies, dramas, pop songs, news, and the like, using a speech recognition function and a text-to-speech (TTS) function of the terminal.

The conversation-based foreign language learning method using the speech recognition function and the TTS function of a terminal according to one embodiment of the present invention may be realized by installing apps adopting the foreign language learning method according to the present invention on a portable terminal, such as a smartphone, a tablet computer, a notebook computer, and the like, which has the speech recognition function and the TTS function. This embodiment may be implemented through Android Studio using Java as an App development tool. However, it should be understood that the present invention may be implemented using various development tools other than Android Studio or using other computer languages, and an operating system for driving a smartphone is not limited to Google Android and may adopt other systems, such as an operating system of Apple iPhone.

A process of comparing the content of the speech input by the learner with the content of a previously stored command and with learning target content may be carried out by at least one selected from the group consisting of a method of comparing recording data of learner's speech with speech data of the learning target content, a method of comparing recording data of the learner's speech with data possessed by a speech recognition system, a method of comparing recording data of the learner's speech with other recording data of the learner's speech stored in advance, a method for comparing text generated by the speech recognition system with text of the learning target content, and a combination thereof.

The foreign language content may include movies, dramas, pop songs, news, and the like, which include foreign language expressions, subtitles of the foreign language expressions, and subtitles of translated native language expressions corresponding to the foreign language expressions. Since there is no limitation on a method of extracting and storing such basic data, all available methods may be used to achieve the objectives of the present invention. Examples of such storage methods include a method of storing the foreign language content in a specific folder of the terminal to retrieve and execute the foreign language content, a method of downloading content stored in a storage device outside the terminal, such as the cloud, a method of downloading the foreign language content from a server on the Internet, and the like through streaming. For specific content, a method of creating a database for storage of the specific content to classify and store data so as to be displayed and used as needed, a method of storing data, such as foreign language texts, native language texts, commands, time information of subtitles, learning grades, and the like in the form of files in a program, such as a text switcher, HashMap, shared preference, and the like without creating the database may be suitably used. In addition, a method of loading and executing all or part of the foreign language content, particularly, each of learning target sentences, from the storage device may also be used according to performance or characteristics of a video or audio player used for natural conversation-based foreign language learning, which is the objective of the present invention. For example, the learner may manipulate the terminal such that a screen or speech for a specific sentence can be realized at a specific playback point (a point where a learning target sentence is present) of the corresponding content, and, if it is difficult to play the corresponding content from the start to the end due to difference in performance of a corresponding media player or the terminal, the content may be divided into units of each learning target sentence, saved, and then executed. Since each of these methods has advantages and disadvantages, these methods may be suitably selected and implemented according to conditions, such as the size of the content provided as a learning target, storage capacity and performance of the terminal carried out by the learner, and the like.

In the method according to the present invention, all or some of foreign language sentences in foreign language subtitles of a foreign language video may be input as an array of basic sentences displayed in a text switcher (String array) and are saved in a program using a text switcher function supported by Android Studio and Java; the content of native language subtitles corresponding to the foreign language sentences are stored corresponding to IDs indicating the sequence number of the basic sentences in the text switcher and keys of the HashMap (a technique for storing and using data in the form of keys and corresponding values) of JAVA and an Android Studio program; and all or one of video or audio files (here, video files refer to files that execute both images and audio, and the audio files refer to files that execute only audio. The video or audio file is used according to learner selection) including the basic sentences are/is divided according to the corresponding sentence(s) or by chapter(s) set according to the content of the sentence(s) and are/is stored with appropriate title(s) (in the case of dividing each file according to the corresponding sentence, it is convenient to attach a title to each file corresponding to the number of the sentence) so as to be executed corresponding to a learning target sentence or a chapter. Here, when execution of an audio file that is divided and saved for each sentence is carried out using a sound pool function (a technique for uploading relatively short audio files in a memory and executing the audio files) of the Android Studio program and JAVA, it is very effective since the audio file of the sentences can be correctly played unlike a media player. This structure can realize an application program that is simple and easy to manage while allowing suitable implementation of the present invention that is aimed at enabling the learner to perform foreign language learning through natural conversation with the terminal via speech transmission. However, it should be understood that the present invention is not limited thereto and various modification and changes can be created without departing the scope of the present invention.

Hereinafter, a conversation-based foreign language learning method using a speech recognition function and a TTS function according to one embodiment of the present invention will be described with reference to FIG. 1 to FIG. 3.

The conversation-based foreign language learning method using a speech recognition function and a TTS function according to the embodiment of the present invention is a conversation-based foreign language learning method through reciprocal speech transmission using foreign language content containing a plurality of foreign language learning target sentences. Referring to FIG. 1, in the conversation-based foreign language learning method, first, voice commands that can be transmitted to a terminal by a learner are previously stored in the terminal (Step S11). Here, the voice commands may be stored in a server or in the cloud besides the terminal. When an app is executed in the terminal to display a screen, the terminal enters a speech waiting state to receive speech input by the learner and informs the learner of the speech waiting state through a sound signal or by displaying the speech waiting state on the screen together with the sound signal (Step S12)). When the learner inputs speech in the speech waiting state in which the terminal can receive the speech input by the learner, the terminal recognizes the content of the speech using a speech recognition function of the terminal (Step S13), compares the content of the speech with a previously stored command (Step S14), executes a corresponding command upon determining that the content of the speech is coincident with a certain command (Step S15), and returns to the speech waiting state (Step S16). In the comparison step (Step S14), the terminal recognizes that the speech input by the learner corresponds to an expression within the foreign language content upon determining that the speech input by the learner in the speech waiting state does not match a certain command.

Figure 2:
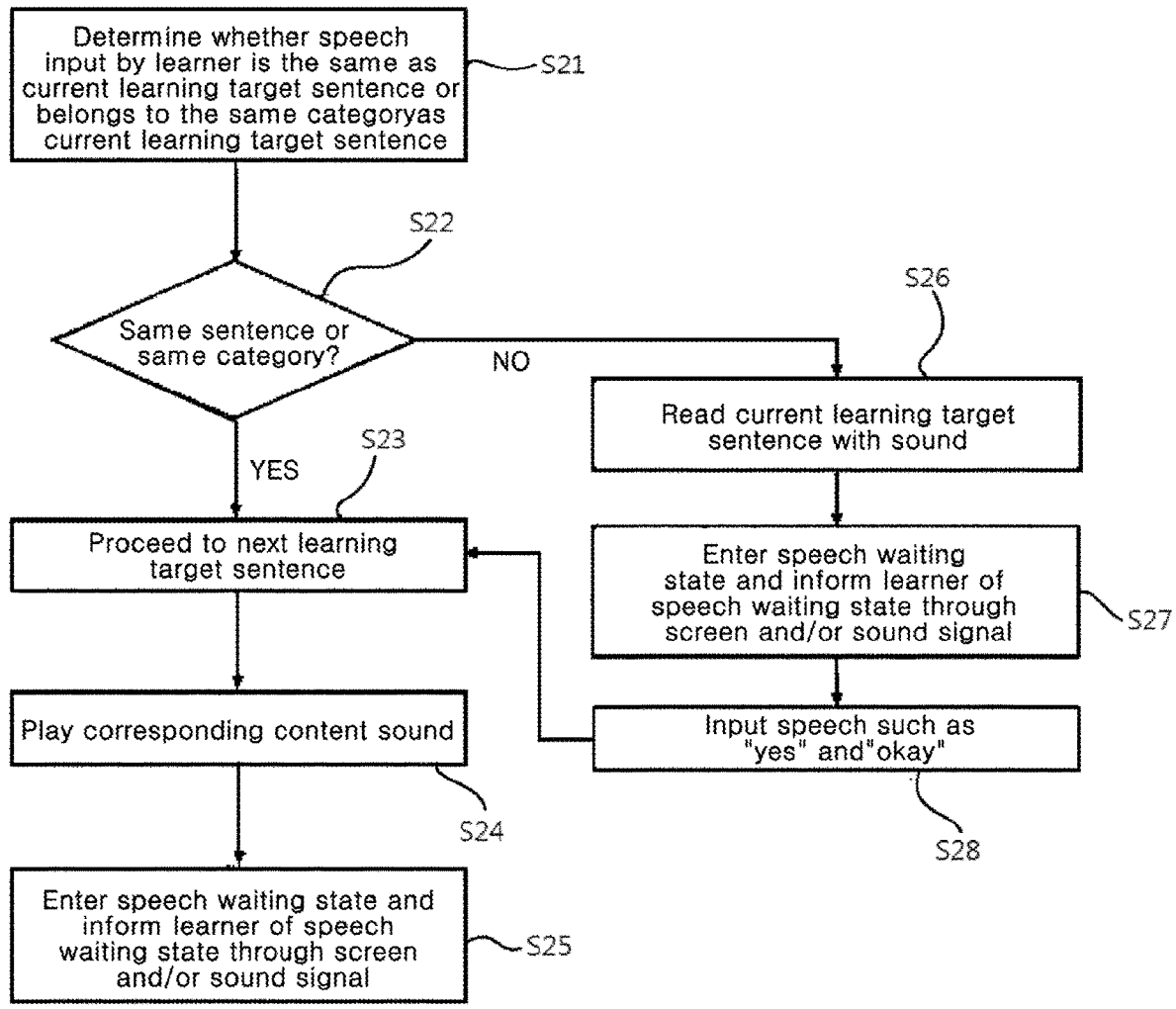
FIG. 2 is a flowchart of a learning mode of a foreign language learning process through speech input of a learner in the conversation-based foreign language learning method according to the present invention.

Upon determining that the speech input by the learner corresponds to the expression within the foreign language content, it is determined whether the speech input by the learner is the same as a current learning target sentence or belongs to the same category as the current learning target sentence (Step S21), as shown in FIG. 2. Upon determining that the speech input by the learner is the same as the current learning target sentence or belongs to the same category as the current learning target sentence (Step S22), the terminal proceeds to the next learning target sentence (Step S23), provides a sound of the foreign language content or a TTS sound corresponding to the next learning target sentence (Step S24), and enters the speech waiting state again to display the speech waiting state on the screen and/or to inform the learner of the speech waiting state through a sound signal (Step S25). Upon determining that the speech input by the learner is not the same as the current learning target sentence or does not belong to the same category as the current learning target sentence (Step S22), the terminal provides the sound of the foreign language content or the TTS sound for the corresponding text sentence until it is determined that the speech input by the learner is the same as the current learning target sentence or belongs to the same category as the current learning target sentence (Step S26), and enters the speech waiting state again to allow the learner to speak again (Step S27) (such a foreign language learning method will hereinafter be referred to as a foreign language learning mode). Here, when the current learning target sentence is repeated due to failure of the learner to continuously input speech that belongs to the same category as the current learning target sentence or when the learner inputs simple speech, such as "yes" and "okay", or a preset voice command, such as "you speak the next learning target sentence" and the like (it should be understood that, since the above example is an example where English is the target language, different expressions are used for other languages.) (Step S28), the terminal may stop foreign language learning for the current learning target sentence and may proceed to the next learning target sentence (Step S23).

Figure 3:
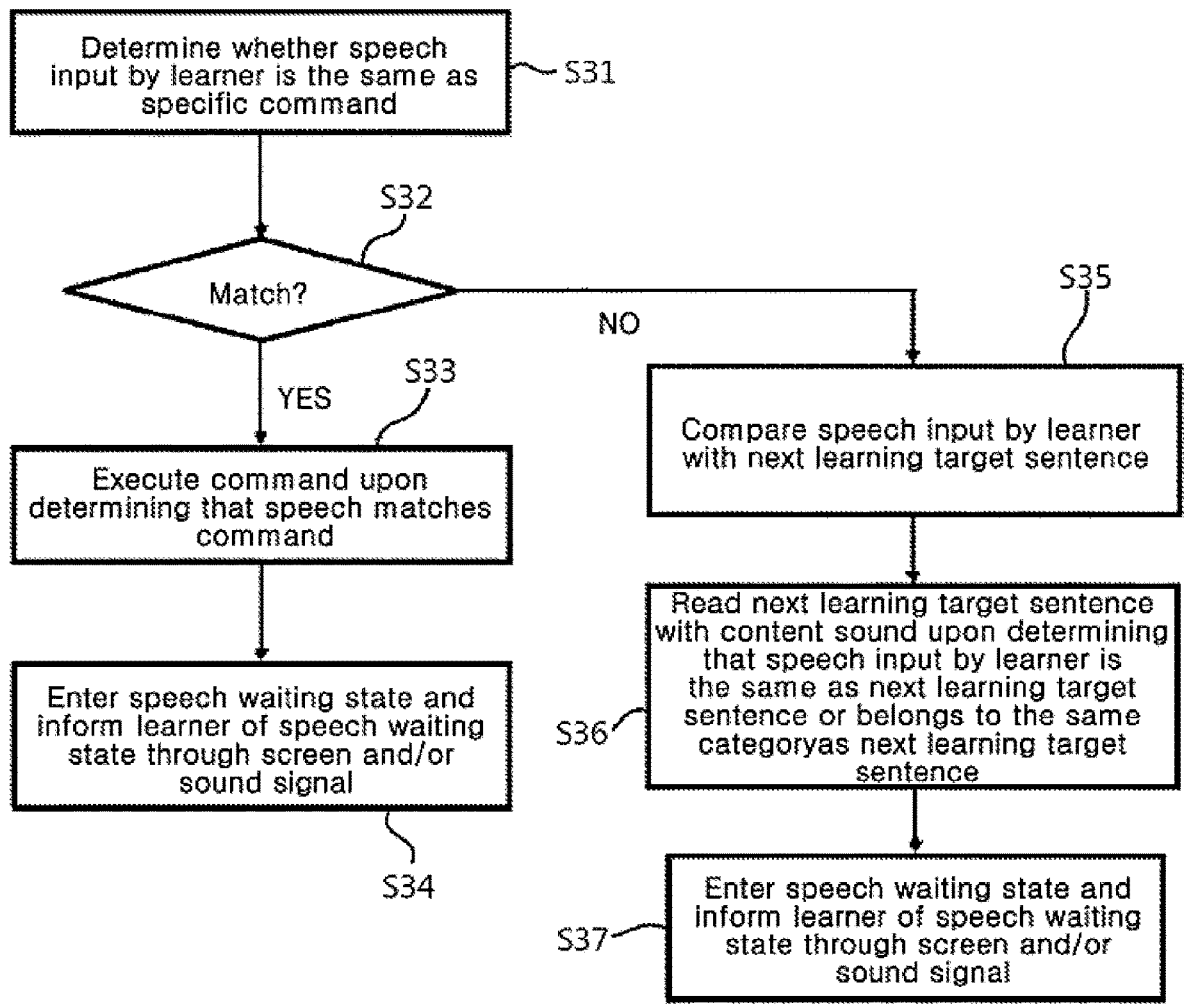
FIG. 3 is a flowchart of a conversation mode of the foreign language learning process through speech input of the learner in the conversation-based foreign language learning method according to the present invention.

Next, upon determining that the speech input by the learner does not match the command and corresponds to an expression for foreign language learning (Step S14), it is determined whether the speech input by the learner is the same as the next learning target sentence of the current learning target sentence or belongs to the same category as the next learning target sentence (Step S35), as shown in FIG. 3. Upon determining that the speech input by the learner is the same as the next learning target sentence of the current learning target sentence or belongs to the same category as the next learning target sentence, the terminal provides a sound of the foreign language content or a TTS sound corresponding to the next learning target sentence of the corresponding foreign language learning target sentence, that is, a sentence next to the next learning target sentence of the current learning target sentence (Step S36), and informs the learner of the speech waiting state to allow the learner to speak the next learning target sentence (Step S37) (Such a foreign language learning method will hereinafter be referred to as a conversation mode).

On the other hand, when preparing to execute all or some of the foreign language content for each of learning target sentences or for each of divided chapters, detailed processes are performed to allow the learner to perform foreign language learning through natural conversation with the terminal using such foreign language content. Here, unlike a typical foreign language learning method using general foreign language content in which the learner watches video while pressing buttons on the screen one by one, the foreign language learning method according to the present invention is aimed at enabling conversation-based foreign language learning by allowing the learner to input speech to the terminal such that the terminal properly responds to the speech input by the learner. The detailed processes for achieving this purpose will be described in the sequence of the problems summarized above as follows.

(1) Detailed Description and Examples of a Solution to the First Problem (Allowing Conversation-Based Foreign Language Learning Through Speech Transmission Instead of Contact)

In the conversation-based foreign language learning method through reciprocal speech transmission using the speech recognition function and the TTS function of the terminal according to the present invention, most procedures from the beginning to a completion time of operation of the terminal are carried out through reciprocal speech transmission between the learner and the terminal while minimizing contact between the learner and a button of the terminal or, if any, a screen of the terminal. Here, it should be noted that the conversation-based foreign language learning method according to the present invention does not require the learner to perform the entire procedure of foreign language learning only through speech transmission without any manipulation of the terminal by the learner to operate the terminal through contact with the screen of the terminal or by pressing the button of the terminal (hereinafter referred to as a contact method) instead of conversation-based foreign language learning through speech transmission (hereinafter referred to as a speech transmission method) foreign language learning. This is because there can occur a special situation where the terminal is turned off or the speech waiting state does not appear for technical reasons in the course of foreign language learning using a terminal including a screen or where the contact method is more advantageous for natural conversation than the speech transmission method and thus is inevitably used together with the speech transmission method. In the method according to the present invention, most main procedures are performed by the speech transmission method. Thus, it should be understood that even an implementation using the contact method together with the speech transmission method with an intention of evading the scope of the present invention can also be interpreted as falling within the scope of the present invention in practice if a substantial part of the main procedure is carried out based on the speech transmission method. In one embodiment of the present invention, as soon as the terminal starts to execute an app to output a sound corresponding to the first learning target sentence or to display the first learning target sentence together with the sound, the terminal informs the learner of a speech waiting state through a sound signal or by displaying the speech waiting state together with the sound signal such that the learner can input speech into the terminal. Such a function may be implemented by including a command to show the speech waiting state in the content to be executed upon start of a program for operating the terminal, such as the onStart function of Java used in Android Studio, without being limited thereto. In this state, the learner may start foreign language learning by transmitting foreign language speech to the terminal using a predefined command or an exact foreign language expression in the stored content. In some embodiments, the terminal may send a sound signal to inform the learner of the speech waiting state with respect to the first learning target sentence or the terminal including a screen may display the learning target sentence on the screen together with the sound signal such that the learner can watch the learning target sentence and speaks the learning target sentence. In addition, the terminal may read the first learning target sentence to the learner through a content sound or a TTS sound or may provide a welcome greeting and guidance for the foreign language learning method to the learner through a preset content sound or TTS sound depending on settings. In some embodiments, the terminal may store a location where the learner finished foreign language learning before and may move to the location upon restart of the app to read the corresponding foreign language learning target sentence to the learner with a content sound or a TTS sound and to display the speech waiting state in which the learner speaks after the terminal.

In the speech waiting state where a program adopting the method according to the present invention is executed in the terminal, the learner performs foreign language learning for a current sentence read by the terminal or speaks a command to the terminal to move to another chapter or the next learning target sentence at which the learner wants to perform foreign language learning. When the current sentence is a sentence that the learner wants to learn, the learner may start new learning by speaking after the terminal reads the sentence. With respect to the speech input by the learner, the terminal reacts according to a determination result as to whether the speech input by the learner corresponds to a command or is the same as any one of learning target sentences or belongs to the same category as any one of the learning target sentences and such reaction includes display of the speech waiting state at the end of reaction such that the learner can inputs next speech. As such, in the foreign language learning method according to the present invention in which the learner inputs speech to the terminal through speech transmission in the speech waiting state of the terminal and the terminal reacts with respect to the speech input by the learner, many procedures of foreign language learning may be carried out through speech transmission between the learner and the terminal instead of the contact method, thereby enabling natural conversation-based foreign language learning through reciprocal speech transmission between the learner and the terminal.

In order to allow continuous natural conversation-based foreign language learning through reciprocal speech transmission between the terminal and the learner without interruption, it is necessary to prevent the speech waiting state from being lost and the present invention uses the following method to this end. In order to prevent the speech waiting state of the terminal from being easily lost, when the learner recognizes the speech waiting state of the terminal and speaks any expression that is recognized as a foreign language, the terminal determines that the current sentence is incorrectly expressed by the learner, reads a correct sentence of the current sentence to the learner with a content voice or a TTS sound, and then enter the speech waiting state again to provide a sound signal such that the learner can recognize the sound signal without watching, if any, the screen of the terminal. As a result, when the learner recognizes that the terminal is in the speech waiting state, since the speech waiting state of the terminal can be prevented from being lost by allowing the learner to speak the simplest foreign language expression (but longer than the minimum length required by a speech recognition program), such as a single word in the current sentence, it is possible for the learner to maintain the conversation state through speech input to an extent that the learner wants to continue conversation with the terminal. In addition, even though the learner should move on to the next learning target sentence after completing learning of the current sentence, if the learner continues to fail to speak the current sentence similarly over a predetermined degree, there can be a problem that the learner is required to repeat the current sentence only. Even in this case, when English is a learning target language, the method according to the present invention allows the learner to proceed to learning of the next learning target sentence by allowing the learner to speak a simple word, such as "yes" and "okay", which is easy for the terminal to recognize, or to speak a predetermined command, such as "you speak the next learning target sentence" and the like. By these means, since the learner can prevent the speech waiting state of the terminal from being lost, it is possible to prevent interruption of natural conversation-based learning.

(2) Detailed Description and Examples of a Solution to the Second Problem (Preparation of Learner Command for Speech Transmission)

In order to achieve the purpose of the present invention to enable foreign language learning through conversation between the learner and the terminal, voice commands to be transmitted to the terminal by the learner are prepared and stored in the terminal such that the terminal allows conversation-based foreign language learning through reaction with respect to the content of the command when the learner delivers a certain command with voice. Reaction of the terminal with respect to speech transmission of the learner is carried out by a particular method so as to allow natural conversation-based foreign language learning through reciprocal speech transmission. That is, upon receiving the speech input by the learner, the terminal executes a corresponding operation upon determining that the command is coincident with any one of the preset commands. Such commands include a movement command to move forwards or backwards by a single or plural sentences between learning target sentences or to move to a previous chapter or the next chapter of a current chapter or to a particular chapter when the learning target sentences are divided by chapters, an execution command, an execution command to read a current sentence or a corresponding sentence with a content sound or a TTS voice while sequentially moving through about 10 or 20 sentences from the current sentence or while skipping the sentences one by one, a video execution command to provide a screen of the terminal together with or without subtitles for the content of each chapter for the terminal including the screen, an audio execution command to play a recorded audio file of corresponding content, a subtitle display command to display subtitles upon execution of video or audio content when the terminal includes the screen, a follow-speech command to provide a time for the learner to speak a current sentence after the terminal and to read the next learning target sentence after execution of a content sound or a TTS sound for the current sentence is finished, a role play command to read a predetermined number of sentences, for example 10 or 20 sentences, or all sentences of the entire chapter to the learner such that the learner can speak after the terminal in a role-play manner, a command to read corresponding native language subtitles with a TTS sound for a hint or explanation for a current sentence or the next learning target sentence that the learner will speak, a command to provide a list of preset voice commands in text or sound format, a command to finish learning and close the app, and the like. In addition, in response to such various movement commands, the terminal enters the speech waiting state after proceeding to a corresponding sentence and reading the corresponding sentence with a content sound or a TTS sound, thereby enabling conversation-based foreign language learning through reciprocal speech transmission according to the present invention. Examples of such commands are as follows.

"Please show me the voice command list" (terminal providing voice command list), "Yes" (terminal reading next learning target sentence to learner with content sound), "Okay" (terminal reading next learning target sentence to learner with TTS sound), "Please speak this sentence" (terminal reading current sentence to learner with content sound), "Please speak the next learning target sentence" (terminal reading next learning target sentence to learner with content sound), "Please let me hear episode speaking" (terminal reading a predetermined number of sentences to learner with TTS sound), "Please let me hear original sound episode speaking" (terminal reading predetermined number of sentences to learner with content sound), "Please let me follow your speaking" (terminal reading a predetermined number of sentences to learner one by one with TTS sound and providing time to allow learner to speak each sentence after terminal), "Please let me follow your speaking 100 times" (terminal reading 100 sentences to learner one by one with TTS sound and providing time to allow learner to speak each sentence after terminal), "Please let me follow your original sound speaking" (terminal reading a predetermined number of sentences to learner one by one with content sound and providing time to allow learner to speak each sentence after terminal), "Please let me follow your original sound speaking 100 times" (terminal reading 100 sentences to learner one by one with content sound and providing time to allow learner to speak each sentence after terminal), "Please skip and play together" (terminal and learner alternately reading a predetermined number of sentences one by one with TTS sound), "Please skip and play original sound speaking together" (terminal and learner alternately reading a predetermined number of sentences one by one with content sound), "Please repeat this sentence" (terminal repeatedly reading current sentence to learner a predetermined number of times with TTS sound), "Please repeat original sound this sentence" (terminal repeatedly reading current sentence to learner a predetermined number of times with content sound), "Hint" (terminal providing native language subtitles of next learning target sentence), "Wait" (terminal stopping speech waiting state for temporary stopping of learning), "Music", "Play music", "Would you play a music for me" (terminal replaying audio file of content of corresponding chapter), "Movie", "Play movie", "Would you play a movie for me" (terminal replaying video file of content of corresponding chapter), "Next chapter", "Please go to next chapter", "Would you please bring me to next chapter" (terminal jumping to next chapter), "Previous chapter", "Please skip to previous chapter", "Would you skip to previous chapter" (terminal jumping to previous chapter), "Seventh chapter, chapter" (terminal jumping to particular chapter), "Next 11, 20, 50, 100, 500, 1000" (terminal jumping forward by numerals), "Previous 11, 20, 50, 100, 500, 1000" (terminal jumping backward by numerals), "First" (terminal jumping to first sentence), "Last" (terminal jumping to last sentence), "Good job see you again soon" (terminal storing learning result grand and finishing learning) [99] Such commands enable natural conversation-based foreign language learning through speech transmission between the learner and the terminal without the contact method in most procedures from the start of the terminal implementing the present invention to the last moment of an operation executed by the terminal.

The method according to the present invention is characterized by enabling natural conversation-based foreign language learning based on reciprocal speech transmission between the terminal and the learner while minimizing contact between the learner and a button or screen of the terminal. Thus, according to the present invention, most commands to be delivered to the terminal by the learner are previously stored in the form of voice command files in the terminal such that the terminal can execute an operation corresponding to a command in response to the command from the learner. However, as the number of such voice commands increases, it can become increasingly difficult to distinguish whether the learner speaks a voice command or any one of learning target sentences. Accordingly, an identifier for making it clear that the content of a voice expression delivered by the learner is not a learning target sentence but a voice command to be performed by the terminal can prevent occurrence of such confusion. For example, foreign language video content, such as movies, dramas, or news, may be divided into chapters each having a suitable length for learners to learn according to the content of a scene or a plot thereof so as to help the learners understand and remember the foreign language video content by watching or listening to the corresponding video or audio in each chapter and learning sentences in each chapter as learning target sentences. In this way, if the foreign language video content are divided into chapters and the divided chapters are given appropriate titles according to the content of the chapters, it will be very helpful for the learner to remember the content of the corresponding chapters and to learn the sentences in the chapter again or to refresh memory of the sentences in the chapter. Since the title of each chapter may be used for a movement command to move to a corresponding chapter, the command using the title of the chapter can cause confusion with the learning target sentence of the foreign language video content. According to the present invention, an identifier created using an expression that does not generally appear in the learning target sentence is used after the title of the chapter to prevent confusion between the voice command and the learning target sentence. For example, when English is a learning target language, an expression that does not generally appear in dialogues of foreign language video content, such as "chapter", is added as an identifier after the title of the chapter. For example, for movement of the terminal to a chapter having a title of "looking for a motive", when the learner speaks an identifier "chapter" after the title of the chapter, that is, "looking for a motive", the terminal recognizes this command as a command to skip to the corresponding chapter and execute the corresponding command. Use of such an identifier is not limited to a movement command between chapters, but may also be used for other voice commands, such as a command to play video or audio of sentences within a chapter and the like.

(3) Third Problem (Implementation of Learning Method in a Learning Mode)

Through continuous appearance of the speech waiting state and speech transmission based on various commands delivered from the learner to the terminal learner, the learner can repeat learning by listening to the content sound or the TTS sound from the terminal for a current learning target sentence and speaking after the terminal. In such a learning process, the learner may select to make the terminal read the learning target sentence with either the content sound or the TTS sound. The content sound that gives accurate pronunciation is necessary for listening training and is very effective for repeated training such that the learner can speak a foreign language with accurate pronunciation. In the case where the terminal does not include a screen or it is difficult to understand the content sound at night or due to noise, the TTS sound can be more effective since the TTS sound is clearer than the content sound. The learner may repeat learning of learning target sentences by combining the aforementioned various commands in various ways while changing the terminal's sound to the content sound or the TTS sound according to the situation. However, depending on learner's ability and difficulty of the foreign language content, it is not easy for the learner to speak a foreign language sentence to the speech recognition system of the terminal to exactly same degree as the foreign language sentence in the foreign language content. In this case, such a problem can be solved by grading the degree of similarity in determination of correctness of an expression created by the learner such that the terminal responds differently according to the similarity grade instead of guiding the learner to continue to speak the same sentence until the learner makes an exactly correct expression if the learner fails to make a correct expression. That is, the degree of similarity is graded in determination of the degree of similarity between what the learner speaks and a sentence to be compared (including a current learning target sentence and the next learning target sentence). Then, upon determining that an expression created by the learner is higher than a preset grade (that the expression created by the learner belongs to the same category as the learning target sentence), the terminal reads the next learning target sentence to the learner and enters the speech waiting state by determining that the learner carries out learning of the learning target sentence to a predetermined level of learning. On the contrary, upon determining that the expression made by the learner is less than a preset grade, the terminal reads the current learning target sentence to the learner and enters the speech waiting state to guide the learner to speak again after the terminal by determining that the learner fails to made an expression belonging to the same category as the learning target sentence. Through such a process, the method according to the present invention allows the learner to perform conversation-based foreign language learning while naturally improving the level without giving up. By way of example, when speech input by the learner is correctly the same as a comparison target sentence, the speech may be rated as Level A; although the speech input by the learner fails to achieve Level A and is not correctly the same as the comparison target sentence, when the speech input by the learner is substantially similar to the comparison target sentence to an extent that the learner is allowed to speak the next sentence, it may be rated as Level B (belonging to the same category as the learning target sentence), thereby allowing the terminal to move to the next sentence even though the learner fails to achieve Level A; and when the speech input by the learner is below B level, it may be rated as Level C.

(4) Detailed Description and Examples of a Solution to the Fourth Problem (Implementation of Interactive Natural Conversation)

A learner who has learned to a certain extent by the above methods can have an ability to speak a certain sentence in the foreign language content without listening to a sound from the terminal. In this case, the learner may require a method of learning a foreign language in a conversation mode in which the learner has a reciprocal conversation with the terminal, instead of continue learning in the above learning mode, such as follow speaking and the like. In order to enable both the learning mode and the conversation mode without deviating from the objective of the present invention to provide a natural conversation-based foreign language learning method through speech transmission rather than the contact method, the following method may be used.

That is, if the speech input by the learner is not a command, it is determined whether the speech input by the learner is the same as the next sentence of a current learning target sentence or belongs to the same category as the current learning target sentence. It is considered that the learner wants to proceed with learning in the conversational mode from a sentence that the learner has spoken instead of learning in the learning mode for the current sentence, upon determining that the speech input by the learner is the same as the next sentence of the current learning target sentence or belongs to the same category as the current learning target sentence. Thus, the terminal proceeds to the next sentence of the sentence spoken by the learner, that is, the next sentence of the current learning target sentence, reads the next sentence to the learner with the content sound or the TTS sound, and enters the speech waiting state.

With this method, the learner can perform foreign language learning in the learning and in the conversation mode without using a particular method for change between the learning mode and the conversation mode, and can perform natural conversation-based foreign language learning in the conversation mode even without speaking an exactly correct expression as in the learning mode.

Next, operation of the terminal in the learning mode and the conversation mode will be described in detail. Upon determining that the speech input by the learner is the same as the next learning target sentence of a current learning target sentence or belongs to the same category as the next learning target sentence thereof, the terminal determines that the learner wants to learn the next learning target sentence of the current learning target sentence in the conversation mode instead of learning the current learning target sentence read by the terminal. That is, upon determining that the learner inputs the same speech as the next learning target sentence (for example, Sentence No. 8) of the current sentence (for example, Sentence No. 7) or speech belonging to the same category as the next sentence instead of speaking the current sentence, the terminal reads a sentence (Sentence No. 9) after the next sentence of the current sentence to the learner and enters the speech waiting state. As such, even after the learner inputs the same speech as the next sentence (Sentence No. 8) or a speech belonging to the same category as the next sentence (Sentence No. 8) instead of speaking the current sentence (Sentence No. 7), and the terminal proceeds to a sentence after the next sentence of the current sentence, that is, Sentence No. 9, to read Sentence No. 9 to the learner and enters the speech waiting state to operate in the conversation mode, the learner may perform foreign language learning in the learning mode by reading the previous sentence (Sentence No. 9) after the terminal or may try to enter the conversation mode by reading the next sentence (Sentence No. 10) of the previous sentence read by the terminal even in the case where the terminal reads the previous sentence (Sentence No. 9) again to the learner due to failure of the learner to input the same speech as the next sentence (Sentence No. 10) or a speech belonging to the same category as the next sentence thereof.

According to the present invention, when the speech input by the learner is neither a voice command nor the same as the current sentence or the next learning target sentence, or belongs to the same category as the current sentence or the next learning target sentence, the foreign language learning method may further include determining whether the speech input by the learner is the same as any one sentence among the entire sentences other than the current sentence or the next learning target sentence. When the speech input by the learner is the same as any one sentence among the entire sentences other than the current sentence or the next learning target sentence, the terminal determines that the learner wants to start learning from the corresponding sentence in the learning mode or in the conversation mode. Then, the terminal proceeds to the next learning target sentence of the sentence spoken by the learner and reads the next learning target sentence to the learner with a content sound or a TTS sound and then enters the speech waiting state.

(5) Detailed Description and Examples of a Solution to the Fifth Problem (Calculation of Suitable Time for Terminal to Enter Speech Waiting State)

According to the present invention, a period of time until the terminal enters the speech waiting state may be set in consideration of a length of a corresponding foreign language learning target sentence and a time that the corresponding foreign language learning target sentence is executed in the foreign language content.

According to the present invention, in response to speech input by the learner, the terminal executes an operation corresponding to the content of each speech and enters the speech waiting state to allow the learner to continue learning in the conversation mode. Here, when a period of time until the terminal enters the speech waiting state is suitably adjusted, it is possible to allow the learner to continue learning in a more natural conversation mode. Such a suitable period of time until the terminal enters the speech waiting state is set in consideration of a time for the terminal to execute a corresponding command or the current or next sentence (hereinafter referred to as a terminal consuming time) and a time for the learner to speak after the terminal (hereinafter referred to as a learner consuming time) in the case where the method includes a process where the learner speaks after the terminal (a process where the learner performs foreign language learning by simply speaking after the terminal, for example, a follow-speech process, instead of speaking after the terminal enters the speech waiting state). In some cases, the period of time until the terminal enters the speech waiting state is determined without considering the terminal consumption time, for example, in the case where the terminal is simply allowed to enter the speech waiting state after finishing overall play of all video or audio files or play of the video or audio files chapter by chapter. In these cases, the period of time until the terminal enters the speech waiting state is determined simply in consideration of the learner consumption time. Here, the terminal consumption time differs depending upon a method in which the terminal reads a current sentence to the learner. When the terminal reads the current sentence with the content sound, the period of time until the terminal enters the speech waiting state is determined depending upon how fast the corresponding sentence is executed in the foreign language content. On the other hand, a time for which the terminal reads the current sentence with the TTS sound is proportional to the number of characters in the corresponding sentence. In general, the time for which the terminal reads a sentence with a content sound is longer than the time for which the terminal reads the sentence with a TTS sound since, for example, since a time for an execution device, such as a media player, to prepare for play and react in order to play the content sound is longer than a play time of the TTS sound. A suitable period of time until the terminal enters the speech waiting state is set in consideration of this point. A suitable terminal consumption time or learner consumption time is set in consideration of a length of the learning target sentence and a time for which the corresponding sentence is executed in the foreign language content. Although an execution time with the content sound is generally determined after calculating a time for displaying subtitles based on time information contained in the subtitles and an execution time with the TTS sound is generally determined in proportion to the number of characters in the corresponding sentence, the period of time until the terminal enters the speech waiting state may be set in consideration of both the length of the corresponding sentence length and an execution time thereof or only one of the sentence length and the execution time. When the sentence length and the execution time are calculated, the calculation result may be applied as it is and the sentence length or the execution time may be divided into several stages to set a different time for each stage. More accurate calculation of the period of time until the terminal enters the speech waiting state enables more natural conversation-based learning. The sentence length can be extracted using a function that calculates the number of characters in a sentence (for example, length( )), and the like, and the execution time may be extracted from a video subtitle file of or an audio lyrics file. Since the subtitle or lyric file contains information indicating a time for which each subtitle or lyric is displayed on the screen and includes start and end times of the subtitles for each subtitle unit (when no separate ending time is indicated, a start time of the next subtitle becomes an end time of a previous subtitle), the execution time of the sentence may be calculated by subtracting the start time from the end time and may be displayed together with the corresponding subtitles.

By way of example, assuming the execution time of the current sentence in the subtitle file is 3 seconds and the terminal reads a certain sentence to the learner with a content sound once in response to speech input by the learner and enters the speech waiting state after the learner speaks the same sentence once after the terminal, the minimum period of time until the terminal enters the next speech waiting state after execution of the terminal is finished in response to the speech input by the learner becomes 6 seconds by adding 3 seconds of the terminal consumption time to 3 seconds of the learner consumption time. Here, since it is necessary to provide an appropriate additional time according to performance of the terminal, characteristics of the media player using the terminal, and learner's ability to listen to and speak a foreign language, a finally calculated suitable time may be 7 to 8 seconds. Such an additional time may be suitably set according to each embodiment. In addition, when the terminal executes the TTS sound instead of the content sound, the execution time of the terminal may be set according to the length of the sentence.

(6) Detailed Description and Examples of a Solution to the Sixth Problem (Correction for Matching Both Sentences)

According to embodiments of the present invention, it is determined whether the speech input by the learner is the same as a comparison target sentence or belongs to the same category as the comparison target sentence by converting the speech input by the learner in the speech waiting state into text through recognition of a speech recognition unit in the terminal, followed by comparing the text with the text of the comparison target sentence. Here, in comparison of the text generated through recognition of the speech with the text of the comparison target sentence, the foreign language learning method may further include correction of both texts or one of the texts in order to allow more natural conversation-based learning. That is, since there can be discordance between the sentence in the subtitles of the foreign language content and the text generated from the speech input by the learner by a speech recognition program, such discordance often causes failure in correct determination even though the speech input by the learner is exactly the same as the current sentence. For example, such incorrect determination as to similarity between the text and the sentence in the subtitles is caused by differences caused by expressing substantially the same meaning using different expression methods depending on whether sentences to be compared are case-sensitively used, whether punctuation marks or special characters are used, how to express numbers, whether abbreviations are used, and the like. Accordingly, the foreign language learning method according to the present invention may further include the step of correction for actual comparison of both character strings or with one character string so as to determine actual similarity between sentences. The correction step includes removing unnecessary blanks or treating the unnecessary blanks as being absent in comparison of the text with the sentence in the subtitles in order to prevent the number and positions of blanks in both sentences from affecting a comparison result. In the correction step, the texts of both sentences may be compared assuming that punctuation marks, such as question mark (?), exclamation point (!), comma (,), period (.), quotation mark (" "), hyphen (-), center point (•), parentheses {( )}, curly braces ({ }), square brackets ([ ]), or spaces incorrectly added at the beginning and end of sentences, and spaces overlapping each other are absent; and that an expression of numbers with Arabic numerals and an expression of numbers with letters; an expression of following verbs or auxiliary verbs in abbreviated forms using an apostrophe (') after a subject and an expression of original forms thereof without using abbreviations; an expression of negative sentences in abbreviated forms using an apostrophe (') and an expression of original forms thereof without using abbreviations; "going to" and "gonna"; "want to" and "wanna"; "got to" and "gotta"; or a sentence used by distinguishing between uppercase and lowercase characters and a sentence used without distinction therebetween may be regarded as being exactly or partially identical to each other.

For example, correction may be realized using a function that changes uppercase characters to lowercase characters (for example, lowerCase( ), a function that replaces specific characters with other characters (for example, replace( ), and the like to correct the sentences generated from subtitles or the text generated from the speech input by the learner to be coincident with each other. Through the correction step, more accurate comparison between the sentences (when two sentences have substantially the same meaning and the content of sounds corresponding to the two sentences is the same, the two sentences are treated as the same) can be achieved, thereby enabling more natural conversation-based foreign language learning.

(7) Detailed Description and Examples of a Solution to the Seventh Problem (Additional Means for Facilitating Interactive Conversation-Based Learning Between Learner and Terminal)

Upon foreign language learning in the conversation mode described above, it is not easy for some learners to memorize sentences that the learner will speak without following the terminal after listening to sounds of the terminal. To compensate for this problem, the terminal including the screen is operated to allow a current foreign language sentence to be displayed together with the next foreign language sentence, whereby the learner can easily try to start foreign language learning in the conversation mode. As a result, the learner can watch the current learning target sentence together with the next learning target sentence on the screen. Thus, when the learner wants to perform learning of the current learning target sentence in the conversation mode after stopping learning of the current learning target sentence in the learning mode, the learner may try to enter foreign language learning in the conversation mode by speaking the next learning target sentence instead of speaking the current sentence after the terminal. After the learner performs foreign language learning to some extent, since it is very important for the learner to continue learning through reciprocal speech transmission together with the terminal, it is meaningful to provide a means for displaying the next learning target sentence. Since the current learning target sentence may be displayed together with the next learning target sentence on the terminal by a typical method known in the art, detailed description of the method will be omitted.

In some cases, depending on learning ability of the learner and characteristics of a learning target foreign language, effective learning cannot proceed since it is too difficult for the learner to listen to the entire sentence as a learning target from the beginning of the sentence and to guide the learner to make an expression after the terminal. In this case, in order to facilitate foreign language learning through conversation between the learner and the terminal, the terminal may read only a part of a specific sentence, for example, a predetermined number of words or characters, among learning target sentences to the learner through the TTS function, instead of reading the entirety of the specific sentence, enter the speech waiting state to allow the learner to speak after the terminal, and determines whether speech input by the learner is the same as the part of the specific sentence or belongs to the same category as the part of the specific sentence. Then, the terminal proceeds to another part of the specific sentence to be learned by the learner upon determining that the speech input by the learner is the same as the part of the specific sentence or belongs to the same category as the part of the specific sentence, or repeatedly reads the part of the specific sentence to the learner for learning upon determining that the speech input by the learner is not the same as the part of the specific sentence or does not belong to the same category as the part of the specific sentence. In this case, a part of the beginning of each learning target sentence may be used as a learning target or one learning target sentence may be divided into a predetermined number of words or characters to allow the learner to proceed to the next learning target sentence after completing the entirety of the learning target sentence. Here, the part of the learning target sentence may be determined depending upon a predetermined number of words or characters by learner selection and the terminal reads this part to the learner with a TTS sound and enters the speech waiting state to allow the learner to speak after the terminal. Then, the terminal may operate in response to a speech input by the learner through recognition of the speech. Details of this operation are the same as the case where foreign language learning is performed using the entirety of the learning target sentence and detailed description thereof will be omitted.

Further, as an additional means for facilitating foreign language learning through conversation between the learner and the terminal, the terminal may read the content of native language subtitles corresponding to the learning target sentence with a TTS sound before the terminal reads the learning target sentence to the learner with the content sound of the foreign language content or the TTS sound. As a result, the learner can listen to the content sound of the foreign language content or the TTS sound after understanding the meaning of the learning target sentence to be read to the learner by the terminal, thereby facilitating learning.

In particular, when the learner cannot quickly read the subtitles in his or her native language due to visual impairment or lack of reading ability or when it is difficult for the learner to understand the meaning of the learning target sentence read to the learner by the terminal due to ambient noise, foreign language learning may be easily performed using the above method.

In the method according to the present invention, a learner who already has considerable foreign language skills may perform foreign language learning through listening to the content of subtitles in his or her native language to guess the corresponding foreign language sentence in his or her mind in advance, followed by checking whether his or her guess is correct based on sounds of the foreign language content.

Further, as an additional means for facilitating foreign language learning through conversation between the learner and the terminal, the terminal may read the learning target sentence to the learner with the TTS sound before reading the corresponding sentence to the learner with the content sound. In general, since TTS sound tends to be heard clearly compared to the foreign language content sound, the above means allows the learner not only to listen to the learning target sentence more clearly, but also to have an effect of repeating the same sentence, thereby facilitating foreign language learning.

Further, as an additional means for facilitating foreign language learning through conversation between the learner and the terminal, the terminal may read the content of the foreign language learning target sentence and the content of native language subtitles corresponding to the learning target sentence to the learner with TTS sounds thereof before the terminal reads the learning target sentence to the learner with the content sound with respect to the learning target sentence. As a result, the learner can also clearly understand the meaning of the learning target sentence and can repeatedly listen to the foreign language content sound again after listening to the learning target sentence with a clear pronunciation, thereby facilitating foreign language learning.

(8) Detailed Description and Examples of a Solution to the Eighth Problem (Recovery Method Upon Disappearance of Speech Waiting State)

As described above, the present invention uses a means for preventing the speech waiting state from disappearing in order to enable natural conversation-based learning through reciprocal speech transmission. However, despite the use of such means, there can be cases where the speech waiting state disappears. In general, the speech recognition unit of the terminal waits for speech input for about 6 to 7 seconds after the speech waiting state starts, and the learner is required to input a speech in a designated language for this period of time (when there is no speech input in this speech waiting state, the speech waiting state disappears or the terminal enters a locked state). According to the present invention, the terminal may be set to accept a learner's operation of pressing one or more buttons on an external remote control (including a pen of Samsung Galaxy Note) or earphones connected thereto through an electric line or electronically by a Bluetooth function as a command for entering the terminal into the speech waiting state such that the terminal can enter into the speech waiting state by pressing a corresponding button on the remote controller or the earphones when the speech waiting state disappears from the terminal, even without pressing a button on the terminal to send the command for turning the terminal into the speech waiting state while watching the screen of the terminal, if any. Such a remote control may include a remote control that acts as a button of a camera, and a writing pen of a mobile phone that has a button provided with a function of another app to act as a remote control upon pressing the button, without being limited thereto. Alternatively, a separate remote controller having the same function may be used. Such a method of entering the terminal into the speech waiting state may include use of programs, such as Google Assistant and Samsung Bixby, besides use of separate hardware, such as a remote control and earphones. Google Assistant can perform certain functions upon input of a Google Assistant command, such as OK Google, through a voice even when a screen of a mobile phone is locked. Thus, one of such functions may be set to a command for entering the terminal into the speech waiting state in an application adopting the method according to the present invention or may be set to a button of the terminal for execute the command, whereby the learner can enter the terminal into the speech waiting state without touching the screen of the terminal. If it is difficult to enter the terminal into the speech waiting state, which is provided as an internal function of the terminal, using such a remote control, it is possible to execute the above program again using the remote controller. As described above, since the above program automatically enters the terminal into the speech waiting state upon installation thereof, the learner may finish previous apps by inputting a command to secondly executed apps through speech input to continue conversation for foreign language learning on the newly executed apps. In this case, on the newly executed apps, the learner may perform foreign language learning from a point where the previous apps ended.

(9) Detailed Description and Examples of a Solution to the Ninth Problem (Calculation and Display of Learning Performance)

The present invention may further include a means for expressing learning performance of the learner as a numerical value based on evaluation of the learning performance in the course of foreign language learning to inspire learner's motivation to learn a foreign language while allowing parents or teachers to confirm achievements of the learner. Such means are not necessarily used in all cases and may be additionally selected according to purposes and learning targets of the learner or learner's parents or teachers. Specifically, when it is evaluated that the speech input by the learner is exactly the same as the learning target sentence, the highest score among the scores that can be given to the corresponding sentence will be given to the learner, and when it is evaluated that, although the learner fails to speak exactly the same sentence, the learner speaks similarly to some extent that the learner is allowed to learn the next sentence, the scores will be differently given according to the degree of similarity of the speech input by the learner to the learning target sentence. When the level of the speech input by the learner is less than the level at which the learner is allowed to learn the next sentence, the terminal requires the learner to continue to speak the next sentence without imparting a score to the speech input by the learner. In addition, even when it is evaluated that the speech input by the learner is exactly the same as the learning target sentence, the scores may be differently given depending upon whether the learner inputs the speech while watching the learning target sentence or without watching the learning target sentence after completely memorizing the learning target sentence, whether the learner inputs the speech while watching only the natively language subtitles or through inference of the remainder of the learning target sentence based on some part of the learning target sentence given as a hint while watching some of the foreign language or native language subtitles as a hint, or whether the learner inputs the speech in the learning mode or in the conversation mode. When the learner inputs preset command speech to the terminal, a score may be given corresponding to difficulty of speaking the preset command. In this case, the degree of similarity of the command speech input by the learner to a preset command stored in the terminal is not separately determined and the score may be given by evaluating that the learner speaks the corresponding command only when the command speech input by the learner is exactly the same as the preset command. According to the present invention, for evaluation of learning performance and for inspiration of motivation to learn a foreign language, the learning performance of the learner may be evaluated to impart a score corresponding thereto, and the foreign language learning method may additionally employ a point accumulation system that stores the score when the learner finishes use of the terminal according to learner's selection to accumulate the scores in addition to the previously obtained scores upon start of next learning.

(10) Detailed Description and Examples of a Solution to the Tenth Problem (Storage of Voice-Recording Data of Learner)

When the terminal proceeds to the next sentence for learning based on determination that the speech input by the learner is exactly the same as the learning target sentence, voice recording data generated by recording a speech input by speaking a certain learning target sentence with a voice of the learner may be stored corresponding to the learning target sentence to be used as needed. In this method, when the terminal enters the speech waiting state to allow the learner to input speech with respect to a certain learning target sentence, the speech input by the learner is recorded by the speech recognition program and is given a title corresponding to the learning target sentence to be stored in the storage device instead of using the recording data for speech recognition. Here, the recording data may be stored after being replaced by new recording data or together with the new recording data according to learner selection. The voice recording data of the learner stored in this method may be used by the learner in various ways, for example, by implementing conversation with the terminal or the voice recording data while listening to the voice recording data or by continuously playing the voice recording data to correct mistakes in the speech of the learner while listening to the voice recording data. Such voice recording data of the learner may be used to compensate for a limitation of the speech recognition program used for implementation of the method according to the present invention. Depending upon performance of the speech recognition program, learner ability or situations, when the learner continuously fails to proceed to the next sentence due to failure of correct speech input to some extent despite last input of correct speech, the recording data generated upon last input of the correct speech may be replayed to allow the learner to proceed to the next sentence after speaking after the correct speech.

According to the present invention, when the content of the speech input by the learner is not exactly the same as the learning target sentence, the speech input by the learner may be converted into text (hereinafter, referred to as inconsistent text) by the speech recognition unit in the terminal to be stored corresponding to the learning target sentence or a sentence number thereof. Such inconsistent texts may be used as materials for foreign language learning of the learner.

According to the present invention, such inconsistent texts may be extracted to be provided as audio or video content to the learner to allow the learner to make an effort to input correct speech after checking a mistake in the content of the speech input by the learner.

According to the present invention, the inconsistent texts stored in the storage device may be rated according to occurrence frequency and part or the entirety of the inconsistent text may be provided to the learner such that the learner can check ranks of the inconsistent texts and can make an effort to avoid frequent mistakes.

In one embodiment of the present invention, words may be extracted from a sentence that the learner fails to input correct speech and may be checked by the learner as to whether the words are included in text generated through speech recognition such that words not included in the text generated through speech recognition can be provided to the learner through a TTS sound or through the screen of the terminal. The following description will focus on this procedure.

When the learner speaks a current learning target sentence to the terminal (in the learning mode described above) and when the learner speaks the next learning target sentence (in the conversation mode described above), each of the learning target sentences may be compared with text generated by converting the speech input by the learner through the speech recognition function of the terminal. Then, upon determining that the text is exactly same as the corresponding learning target sentence, words may be extracted from the learning target sentence and may be checked as to whether the words are included in the text generated through speech recognition such that words not included in the text generated through speech recognition can be provided to the learner through a TTS sound or through the screen of the terminal. The words not included in the text may be stored as incorrect words corresponding to the sentence number of the learning target sentence in an internal storage device of the terminal or in an external storage device. The terminal may extract frequency of the incorrect words, may arrange the incorrect words in the order of words with high frequency thereof, and may notify all or part of the words to the learner.

(11) Detailed Description and Examples of a Solution to the Eleventh Problem (Solution to Copyright Law)

According to the present invention, in order to prevent implementation of the present invention from becoming illegal, content installed with permission of a copyright holder may be searched for in the terminal or in a specific folder inside the terminal in the course of executing app software upon implementation of the present invention using content subject to copyright law. If such content is not found, the method according to the present invention may further include a process of suspending execution of the content installed without permission of the copyright holder and displaying a message requesting execution of the content after installing the content obtained with permission of the copyright holder. Details of the processes of confirming whether foreign language content installed under permission of a copyright holder is present in the terminal or in a specific folder inside the terminal, suspending execution of the content installed without permission of the copyright holder, and displaying a message requesting execution of the content after installing the content obtained with permission of the copyright holder are well known in the art and detailed description thereof will be omitted.

(12) Detailed Description and Examples of a Solution to the Eleventh Problem (Use of Multiple Subtitles)

For foreign language learning, since it is necessary for learners to understand the meaning of a foreign language to be learned, there is a need for subtitles in a native language. Such subtitles are required to be separately produced using a language used by each of the learners. Accordingly, a foreign language learning machine and a foreign language learning method for learners from various countries are prepared separately according to the language used by each of the learners. However, when the learning machine or the learning method is aimed at learning the same foreign language and is provided with a plurality of subtitles created in different languages, a plurality of learners capable of speaking the same language as the subtitles can use the subtitles together and there is no need for separate production of the subtitles with each language, thereby providing economic feasibility Furthermore, the learning machine or the learning method aimed at learning the same foreign language (first foreign language) may be provided with a plurality of subtitles produced in different languages such that the subtitles produced in a foreign language (second foreign language) other than a native language of the learner can be displayed on the screen of the terminal according to learner selection and can be read to the learner with a TTS sound by the terminal so as to allow the learner to speak after the terminal, whereby the learner can effectively learn multiple foreign languages without using a separate foreign language learning machine or method.

When the subtitles created in a plurality of languages are displayed together on the screen, the meaning of a foreign language to be learned can be understood more clearly by the learner and there is an effect of making it possible for the learner to recognize errors in the incorrect subtitles.

The method of producing and displaying the plurality of subtitles on the screen of the terminal according to learner selection may be realized by producing a plurality of subtitles in different foreign languages through translation of learning target foreign language sentences such that the learner can select subtitles in one or multiple foreign languages together with native language subtitles on the screen of the terminal and the size of characters can be adjusted according to the number of subtitles selected by the learner.

In order to use the language of the subtitles for learning of a second foreign language, the terminal is required to read the subtitles selected by the learner using the TTS function. However, there is a problem that the terminal fails to read a short sentence due to limitation of the TTS function. In this case, the problem may be solved by linking the content of subtitles twice or more to transform the short sentence into a sentence having a sufficient length to read the sentence with the TTS. If the length of the sentence is too short to read the sentence with the TTS even after linking the sentence twice, the sentence may be liked three times. Since the learner is guided to repeat speaking of the content of the subtitles after listening to the content of the subtitles read to the learner by the terminal, the number of such connections may be adjusted according to the length of the subtitles and reading ability of the TTS function without being limited to a particular number of connections.

Depending on characteristics of a foreign language and learning ability of the learner, foreign language learning cannot be efficiently performed since it is very difficult for the learner to speak the entire content of the subtitles after listening to the entire subtitle sentence once. In this case, more efficient learning can be achieved when the terminal reads only a certain number of words or characters in a specific subtitle sentence to the learner with a TTS sound to allow the learner to speak after the terminal. In particular, in cases where it is important and difficult to learn pronunciation of each letter in a certain language, such as Chinese, preferably, the terminal reads only a part of each sentence (as many words or characters as the number selected by a user) to the learner with a TTS sound to allow the learner to speak the corresponding part after the terminal, instead of reading the entire sentence such that the learner speaks the entire sentence after listening to the entire sentence from the beginning. Since it is not difficult in terms of character processing technology to extract and read a certain number of words or characters from a sentence, detailed description of this technology is omitted herein.

Although some embodiments have been described herein, it should be understood that these embodiments are provided for illustration only and are not to be construed in any way as limiting the present invention, and that various modifications, changes, alterations, and equivalent embodiments can be created by those skilled in the art without departing from the spirit and scope of the invention.

INDUSTRIAL APPLICABILITY

The present invention relates to a conversation-based foreign language learning method that enables foreign language learning through natural conversation between a learner and a terminal, such as a smartphone, a tablet computer, a notebook computer, a talking toy, an AI speaker, and the like, based on video or audio content containing foreign language sound expressions, such as movies, dramas, pop songs, news, and the like, via speech transmission using a speech recognition function and a TTS function of the terminal, and may be very usefully applied to foreign language learning industries.

The invention claimed is:

1. A conversation-based foreign language learning method using a speech recognition function and a TTS function of a terminal through interactive conversation between a learner and the terminal based on video or audio foreign language content containing a plurality of foreign language learning target expressions, the method comprising:

a process of repeating an operation that the terminal informs the learner of a speech waiting state through a sound signal and/or a screen thereof with an image indicating the speech waiting state of the terminal and, when the learner inputs speech to the terminal in the speech waiting state, the terminal responds according to the speech input by the learner and enters the speech waiting state again, followed by informing the learner of the speech waiting state through the sound signal and/or the screen to allow the learner to input new speech to the terminal, whereby the learner can perform foreign language learning through interactive conversation with the terminal via speech transmission without touch of, if any, the screen;

a process in which the terminal previously stores voice commands to be delivered from the learner to the terminal in a storage device; when the learner inputs speech in the speech waiting state of the terminal, the terminal executes a corresponding command, enters the speech waiting state again and informs the learner of the speech waiting state upon determining that the speech input by the learner matches a specific command stored in the storage device through comparison of the speech with the commands stored in the storage device using a speech recognition function; the terminal determines whether the speech input by the learner is the same as a current learning target sentence in the foreign language content or belongs to the same category as the current learning target sentence upon determining that the speech input by the learner does not match any command stored in the storage device; the terminal reads the next learning target sentence of the current learning target sentence in the foreign language content with a TTS sound or a corresponding content sound of the foreign language content, enters the speech waiting state again and informs the learner of the speech waiting state upon determining that the speech input by the learner is the same as the current learning target sentence or belongs to the same category as the current learning target sentence; and the terminal reads the current learning target sentence with a TTS sound or a corresponding content sound of the foreign language content, enters the speech waiting state again and informs the learner of the speech waiting state to allow the learner to speak the current learning target sentence again upon determining that the speech input by the learner is not the same as the current learning target sentence or does not belong to the same category as the current learning target sentence; and a process in which, upon determining through comparison of the speech with the commands stored in the storage device that the speech input by the learner does not match any command stored in the storage device, the terminal determines whether the speech input by the learner is the same as the next learning target sentence of the current learning target sentence or belongs to the same category as the next learning target sentence; and the terminal proceeds to the next sentence of the corresponding sentence, that is, a sentence after the next learning target sentence of the current learning target sentence, reads the next sentence to the learner with a TTS sound or a corresponding content sound of the foreign language content, enters the speech waiting state again and informs the learner of the speech waiting state to allow the learner to input speech with respect to the next sentence of the corresponding sentence, that is, a sentence after the next learning target sentence of the current learning target sentence, upon determining that the speech input by the learner is the same as the next learning target sentence or belongs to the same category as the next learning target sentence.

2. The conversation-based foreign language learning method according to claim 1, wherein a period of time until the terminal enters the speech waiting state is set in consideration of a length of a corresponding foreign language learning target sentence and/or a period of time for which the corresponding foreign language learning target sentence is executed in the foreign language content.

3. The conversation-based foreign language learning method according to claim 1, wherein, in determination as to whether text obtained through conversion of the speech input by the learner is the same as text of the foreign language learning target sentence in the foreign language content or belongs to the same category as the text of the foreign language learning target sentence, both texts are compared assuming that punctuation marks, or spaces incorrectly added at the beginning and end of sentences, and spaces overlapping each other are absent; and that an expression of numbers in Arabic numerals and an expression of numbers with letters; an expression of following verbs or auxiliary verbs in abbreviated forms using an apostrophe (') after a subject and an expression of original forms thereof without using abbreviations; an expression of negative sentences in abbreviated forms using an apostrophe (') and an expression of original forms thereof without using abbreviations; "going to" and "gonna"; "want to" and "wanna"; "got to" and "gotta"; or a sentence used by distinguishing between uppercase and lowercase characters and a sentence used without distinction therebetween are regarded as being exactly or partially identical to each other.

4. The conversation-based foreign language learning method according to claim 1, wherein, when learning with respect to a foreign language learning target sentence is repeated due to failure of the learner to continuously input speech that belongs to the same category as the foreign language learning target sentence or when the learner inputs simple speech or a preset voice command, the terminal stops reading of a current foreign language learning target sentence and proceeds to the next learning target sentence of the current foreign language learning target sentence to allow the learner to learn the next learning target sentence of the current foreign language learning target sentence.

5. The conversation-based foreign language learning method according to claim 1, wherein a terminal having a screen displays a current learning target sentence of the foreign language content together with the next learning target sentence thereof.

6. The conversation-based foreign language learning method according to claim 1, further comprising:

a process in which the terminal reads a predetermined number of words or characters of a specific sentence to the learner with a TTS sound among learning target sentences, enters the speech waiting state and informs the learner of the speech waiting state to allow the learner to speak the predetermined number of words or characters of the specific sentence after the terminal; and the terminal proceeds to the next learning target sentence, reads a predetermined number of words or characters of the next learning target sentence to the learner with a TTS sound, enters the speech waiting state and informs the learner of the speech waiting state to allow the learner to speak the predetermined number of words or characters of the next learning target sentence after the terminal, upon determining that speech input by the learner is the same as the predetermined number of words or characters of the specific sentence or belongs to the same category as the predetermined number of words or characters of the specific sentence, and the terminal reads the same part of the specific sentence again to the learner with the TTS sound to allow the learner to speak the same part of the specific sentence again after the terminal, upon determining that the speech input by the learner is not the same as the predetermined number of words or characters of the specific sentence or does not belong to the same category as the predetermined number of words or characters of the specific sentence.

7. The conversation-based foreign language learning method according to claim 1, wherein the terminal reads native language subtitles to the learner with a TTS sound corresponding to the learning target sentence before the terminal provides a foreign language content sound or a TTS sound for the learning target sentence to the learner.

8. The conversation-based foreign language learning method according to claim 1, wherein the terminal reads the learning target sentence to the learner with a TTS sound before the terminal provides a foreign language content sound for the learning target sentence to the learner.

9. The conversation-based foreign language learning method according to claim 1, wherein the terminal reads the learning target sentence and native language subtitles to the learner with TTS sounds corresponding to the learning target sentence before the terminal provides a foreign language content sound for the learning target sentence to the learner.

10. The conversation-based foreign language learning method according to claim 1, wherein, when the speech waiting state of the terminal is lost, the learner is guided to press one or more buttons on a remote controller or earphones, or to use another software program for speech recognition, so as to activate the speech waiting state.

11. The conversation-based foreign language learning method according to claim 1, wherein performance of foreign language learning of the learner is evaluated and the learner is informed thereof in a process of allowing the learner to learn a foreign language through interactive conversation using the foreign language content.

12. The conversation-based foreign language learning method according to claim 1, wherein, when the terminal proceeds to the next learning target sentence to perform foreign language learning based on determination that the speech input by the learner is exactly the same as the current learning target sentence, speech recording data of the learner are stored corresponding to the learning target sentence such that the speech recording data generated by exactly speaking a specific sentence can be preserved and used as needed.

13. The conversation-based foreign language learning method according to claim 12, comprising: at least one selected from the group consisting of a process of recording and storing data obtained by exactly speaking a learning target sentence by the learner to use the data as data for improving speed and accuracy of speech recognition in comparison with a content sound for the corresponding sentence, a process of recording and storing data obtained by exactly speaking a learning target sentence by the learner to use the data as data for improving speed and accuracy of speech recognition in comparison with previous recording data of the learner, a process of recording and storing data obtained by exactly speaking a learning target sentence by the learner to use the data as assistant data in comparison with data for speech recognition stored in the storage device by a speech recognition system, and combinations thereof.

14. The conversation-based foreign language learning method according to claim 1, wherein, upon determining that speech input by the learner is not exactly the same as a learning target sentence, text converted from the speech of the learner by a speech recognition function of the terminal is stored corresponding to the learning target sentence or a sentence number thereof.

15. The conversation-based foreign language learning method according to claim 1, wherein, upon determining that speech input by the learner is not exactly the same as a learning target sentence, the learner is informed of a difference between text converted from the speech of the learner by a speech recognition function of the terminal and the learning target sentence.

16. The conversation-based foreign language learning method according to claim 1, wherein, upon determining that speech input by the learner is not exactly the same as a learning target sentence, a difference between text converted from the speech of the learner by a speech recognition function of the terminal and the learning target sentence is stored in the terminal.

17. The conversation-based foreign language learning method according to claim 1, wherein, upon determining that speech input by the learner is not exactly the same as a learning target sentence, the learner is informed of words not included in text converted from the speech of the learner by a speech recognition function of the terminal among words included in the learning target sentence.

18. The conversation-based foreign language learning method according to claim 1, wherein, upon determining that speech input by the learner is not exactly the same as a learning target sentence, words not included in text converted from the speech of the learner by a speech recognition function of the terminal among words included in the learning target sentence are stored in the terminal.

19. The conversation-based foreign language learning method according to claim 1, wherein, upon determining that speech input by the learner is not exactly the same as a learning target sentence, words not included in text converted from the speech of the learner by a speech recognition function of the terminal among words included in the learning target sentence are stored in the terminal, a frequency of each of the words stored in the terminal is checked, and the learner is informed of all or some of words with high frequency among the words stored in the terminal.

20. The conversation-based foreign language learning method according to claim 1, wherein an identifier is added to all or part of the voice commands delivered from the learner to the terminal so as to prevent confusion with the learning target sentence.

21. The conversation-based foreign language learning method according to claim 1, further comprising:
a process of displaying a message asking to execute foreign language learning after storing foreign language content with permission of a copyright holder in the storage device, followed by prohibiting foreign language learning upon determining that there is no foreign language content with permission of the copyright holder in the storage device.

22. A conversation-based foreign language learning method using a speech recognition function and a TTS function of a terminal through interactive conversation between a learner and the terminal based on video or audio foreign language content containing a plurality of foreign language learning target expressions, the method comprising:
a process of repeating an operation that the terminal informs the learner of a speech waiting state through a sound signal and/or a screen thereof with an image indicating the speech waiting state of the terminal and, when the learner inputs speech to the terminal in the speech waiting state, the terminal responds according to the speech input by the learner and enters the speech waiting state again, followed by informing the learner of the speech waiting state through the sound signal and/or the screen to allow the learner to input new speech to the terminal, whereby the learner can perform foreign language learning through interactive conversation with the terminal via speech transmission without touch of, if any, the screen;
a process in which the terminal previously stores voice commands to be delivered from the learner to the terminal in a storage device; when the learner inputs speech in the speech waiting state of the terminal, the terminal executes a corresponding command, enters the speech waiting state again and informs the learner of the speech waiting state upon determining that the speech input by the learner matches a specific command stored in the storage device through comparison of the speech with the commands stored in the storage device using a speech recognition function; the terminal determines whether the speech input by the learner is the same as a current learning target sentence in the foreign language content or belongs to the same category as the current learning target sentence upon determining that the speech input by the learner does not match any command stored in the storage device; the terminal reads the next learning target sentence of the current learning target sentence in the foreign language content with a TTS sound or a corresponding content sound of the foreign language content, enters the speech waiting state again and informs the learner of the speech waiting state upon determining that the speech input by the learner is the same as the current learning target sentence or belongs to the same category as the current learning target sentence; and the terminal reads the current learning target sentence with a TTS sound or a corresponding content sound of the foreign language content, enters the speech waiting state again and informs the learner of the speech waiting state to allow the learner to speak the current learning target sentence again upon determining that the speech input by the learner is not the same as the current learning target sentence or does not belong to the same category as the current learning target sentence;

a process in which, upon determining through comparison of the speech with the commands stored in the storage device that the speech input by the learner does not match any command stored in the storage device, the terminal determines whether the speech input by the learner is the same as the next learning target sentence of the current learning target sentence or belongs to the same category as the next learning target sentence; the terminal proceeds to the next sentence of the corresponding sentence, that is, a sentence after the next learning target sentence of the current learning target sentence, reads the next sentence to the learner with a TTS sound or a corresponding content sound of the foreign language content, enters the speech waiting state again and informs the learner of the speech waiting state to allow the learner to input speech with respect to the next sentence of the corresponding sentence, that is, a sentence after the next learning target sentence of the current learning target sentence, upon determining that the speech input by the learner is the same as the next learning target sentence or belongs to the same category as the next learning target sentence; and a process in which, upon determining that the speech input by the learner is the same as any one sentence excluding the current learning target sentence and the next learning target sentence among learning target sentences, the terminal proceeds to the next sentence of the corresponding sentence, reads the next sentence to the learner with a TTS sound or a corresponding content sound of the foreign language content, enters the speech waiting state again and informs the learner of the speech waiting state to allow the learner to input speech with respect to the sentence read to the learner by the terminal or the next sentence thereof, that is, the next sentence of the sentence read to the learner by the terminal.

23. A conversation-based foreign language learning method using a speech recognition function and a TTS function of a terminal through interactive conversation between a learner and the terminal based on video or audio foreign language content containing a plurality of foreign language learning target expressions, the method comprising:

a process of repeating an operation that the terminal informs the learner of a speech waiting state through a sound signal and/or a screen thereof with an image indicating the speech waiting state of the terminal and, when the learner inputs speech to the terminal in the speech waiting state, the terminal responds according to the speech input by the learner and enters the speech waiting state again, followed by informing the learner of the speech waiting state through the sound signal and/or the screen to allow the learner to input new speech to the terminal, whereby the learner can perform foreign language learning through interactive conversation with the terminal via speech transmission without touch of, if any, the screen;

a process in which the terminal previously stores voice commands to be delivered from the learner to the terminal in a storage device; and when the learner inputs speech in the speech waiting state of the terminal, the terminal executes a corresponding command upon determining that the speech input by the learner matches a specific command stored in the storage device through comparison of the speech with the commands stored in the storage device using a speech recognition function;

a process in which, upon determining that the speech input by the learner does not match any command stored in the storage device, the terminal determines whether the speech input by the learner is the same as a current learning target sentence in the foreign language content or belongs to the same category as the current learning target sentence; the terminal reads the next learning target sentence of the current learning target sentence in the foreign language content with a TTS sound or a corresponding content sound of the foreign language content and enters the speech waiting state again upon determining that the speech input by the learner is the same as the current learning target sentence or belongs to the same category as the current learning target sentence; and the terminal reads the current learning target sentence with a TTS sound or a corresponding content sound of the foreign language content, enters the speech waiting state again and informs the learner of the speech waiting state to allow the learner to speak the current learning target sentence again upon determining that the speech input by the learner is not the same as the current learning target sentence or does not belong to the same category as the current learning target sentence;

a process in which, upon determining through comparison of the speech with the commands stored in the storage device that the speech input by the learner does not match any command stored in the storage device, the terminal determines whether the speech input by the learner is the same as the next learning target sentence of the current learning target sentence or belongs to the same category as the next learning target sentence; the terminal proceeds to the next sentence of the corresponding sentence, that is, a sentence after the next learning target sentence of the current learning target sentence, reads the next sentence to the learner with a TTS sound or a corresponding content sound of the foreign language content, enters the speech waiting state again and informs the learner of the speech waiting state to allow the learner to input speech with respect to the next sentence of the corresponding sentence, that is, a sentence after the next learning target sentence of the current learning target sentence, upon determining that the speech input by the learner is the same as the next learning target sentence or belongs to the same category as the next learning target sentence; and a process in which the terminal is provided with a plurality of subtitles created in different languages including a native language and corresponding to learning target foreign language sentences such that one or plural subtitles can be displayed on a screen of the terminal according to learner selection.

24. The conversation-based foreign language learning method according to claim 23, further comprising:

a process in which the terminal reads the subtitles to the learner with a TTS sound in a foreign language other than the native language of the learner according to learner selection.

25. The conversation-based foreign language learning method according to claim 24, further comprising:

a process in which, after reading the subtitles to the learner using the TTS sound in the foreign language other than the native language of the learner, the terminal enters the speech waiting state and informs the learner of the speech waiting state to allow the learner to speak what the learner listens to; the terminal reads the next subtitles of the current subtitles to the learner with a TTS sound and enters the speech waiting state upon determining that speech input by the learner is the same as the content of the subtitles read by the terminal or belongs to the same category as the content of the subtitles read by the terminal; and the terminal reads the current subtitles with a TTS sound, enters the speech waiting state and informs the learner of the speech waiting state to allow the learner to speak the current subtitles again after the terminal, upon determining that the speech input by the learner is not the same as the content of the subtitles read by the terminal or does not belong to the same category as the content of the subtitles read by the terminal.

26. The conversation-based foreign language learning method according to claim 24, wherein, when the terminal reads the subtitles to the learner using the TTS sound in the foreign language other than the native language of the learner and a corresponding sentence of the subtitles is too short for the terminal to read the corresponding sentence, the corresponding sentence is linked twice or more to a sentence having a length so as to allow the terminal to read the corresponding sentence.

27. The conversation-based foreign language learning method according to claim 24, wherein the terminal reads a part of a specific sentence to the learner with a TTS sound instead of reading the entirety of the specific sentence among sentences of the subtitles in foreign languages other than the native language.

28. The conversation-based foreign language learning method according to claim 1, wherein a process of sequentially displaying learning target sentences of the foreign language content on the screen of the terminal is implemented using a text switcher function supported by Android Studio and Java; native language subtitles corresponding to the learning target sentences of the foreign language content are stored in the form of HashMap of Java and an Android Studio program to be used as needed; and a process of executing an audio file containing a content sound of the foreign language content is implemented using a sound pool function of the Android Studio program and Java.

* * * * *